(12) United States Patent
Andren et al.

(10) Patent No.: US 6,603,801 B1
(45) Date of Patent: Aug. 5, 2003

(54) SPREAD SPECTRUM TRANSCEIVER FOR USE IN WIRELESS LOCAL AREA NETWORK AND HAVING MULTIPATH MITIGATION

(75) Inventors: Carl Andren, Indialantic, FL (US); Mark A. Webster, Palm Bay, FL (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 09/231,228

(22) Filed: Jan. 14, 1999

Related U.S. Application Data

(60) Provisional application No. 60/071,659, filed on Jan. 16, 1998.

(51) Int. Cl.[7] .......................... H04B 15/00; H04K 1/00; H04L 27/30
(52) U.S. Cl. ........................................ 375/147; 375/130
(58) Field of Search ................................. 375/130, 140, 375/141, 142, 147, 148, 144, 150, 367, 219, 229, 233, 259, 262, 265, 269, 279, 308, 329, 341, 343

(56) References Cited

U.S. PATENT DOCUMENTS

| | | | |
|---|---|---|---|
| 4,346,473 A | 8/1982 | Davis ........................... 371/43 |
| 4,545,054 A | 10/1985 | Davis ........................... 371/43 |
| 4,626,796 A | 12/1986 | Elder ........................... 331/1 A |
| 4,914,699 A | * 4/1990 | Dunn et al. ................... 375/133 |
| 5,103,459 A | 4/1992 | Gilhousen et al. ............. 375/1 |
| 5,216,434 A | 6/1993 | Fukumura ................... 343/876 |
| 5,291,523 A | * 3/1994 | Bergmans et al. ............. 360/51 |
| 5,309,474 A | 5/1994 | Gilhousen et al. ............. 375/1 |
| 5,367,516 A | 11/1994 | Miller ......................... 370/19 |
| 5,369,801 A | 11/1994 | Smith ......................... 455/277 |
| 5,416,797 A | 5/1995 | Gilhousen et al. .......... 375/705 |
| 5,497,395 A | 3/1996 | Jou ............................. 375/205 |
| 5,515,396 A | 5/1996 | Dalekotzin ................... 375/200 |
| 5,530,926 A | 6/1996 | Rozanski ................. 455/277.2 |
| 5,535,239 A | 7/1996 | Padovani et al. ........... 375/205 |
| 5,550,810 A | * 8/1996 | Monogioudis et al. ....... 370/342 |
| 5,577,025 A | 11/1996 | Skinner et al. ............... 370/22 |
| 5,598,154 A | 1/1997 | Wilson et al. ................. 341/50 |
| 5,621,752 A | 4/1997 | Antonio et al. ............. 375/200 |
| 5,659,573 A | 8/1997 | Bruckert et al. ............ 375/200 |
| 5,682,404 A | 10/1997 | Miller ......................... 375/222 |
| 5,692,006 A | 11/1997 | Ross ........................... 375/200 |
| 5,748,676 A | 5/1998 | Mahany ...................... 375/260 |
| 5,774,504 A | 6/1998 | Huszar et al. ............... 375/341 |
| 5,790,534 A | 8/1998 | Kokko et al. ............... 370/335 |
| 5,841,819 A | 11/1998 | Hu et al. ..................... 375/341 |
| 5,844,741 A | 12/1998 | Yamakawa et al. ........... 360/65 |
| 6,012,161 A | * 1/2000 | Ariyavisitakul et al. .... 375/233 |
| 6,356,555 B1 | * 3/2002 | Rakib et al. ................. 370/441 |

FOREIGN PATENT DOCUMENTS

| | | | |
|---|---|---|---|
| EP | 0 731 587 A2 | 9/1996 | .......... H04L/27/22 |
| WO | WO 97/36396 | 10/1997 | ............. H04L/7/04 |

OTHER PUBLICATIONS

Cheung, et al., "Soft–Decision Feedback Equalizer For Continuous Phase Modulated Signals in Wideband Mobile Radio Channels," IEEE Transactions on Communications, vol. 42, No. 2/03/04, Feb. 1, 1994, pp. 1628–1638.

* cited by examiner

*Primary Examiner*—Jean Corrielus
(74) *Attorney, Agent, or Firm*—Gary R. Stanford

(57) ABSTRACT

A method and spread spectrum transceiver for demodulating a spread spectrum signal is disclosed. A spread spectrum phase shift keyed (PSK) modulated information signal is received within a demodulator of a spread spectrum receiver on a signal channel. The information signal includes a sequence of data symbols formed from a plurality of high rate mode chips. A precursor portion of the signal channel is Viterbi detected. A multi-state trellis is formed having a predetermined number of states. A post-cursor portion of the signal channel is feedback equalized with a finite impulse response filter having feedback taps operatively connected to a chip detection circuit that tracks high rate mode chips and a carrier loop circuit for phase and frequency tracking. The information signal is despread within a spread spectrum code function correlator.

24 Claims, 34 Drawing Sheets

ARCHITECTURE FOR THE VITERBI-DFE

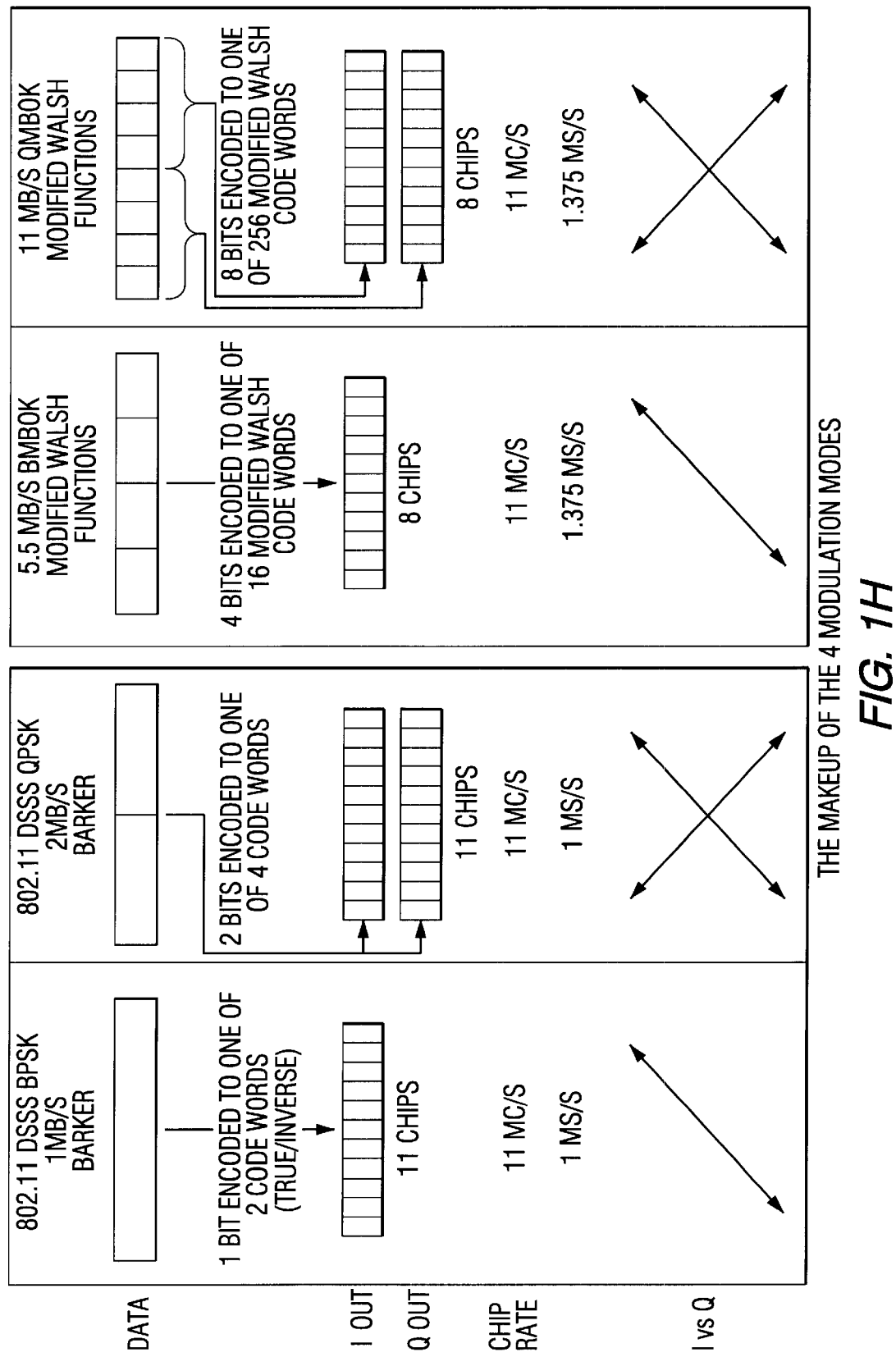
FIG. 1H THE MAKEUP OF THE 4 MODULATION MODES

THE KEY SYSTEM COMPONENTS INDUCING END-TO-END LINEAR DISTORTION.

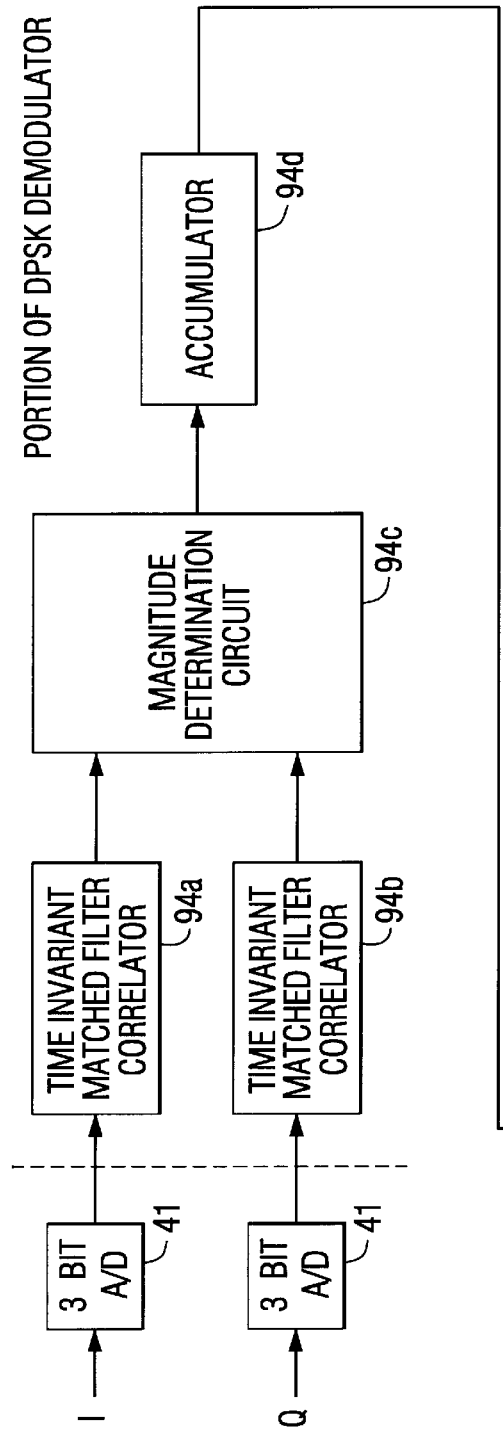
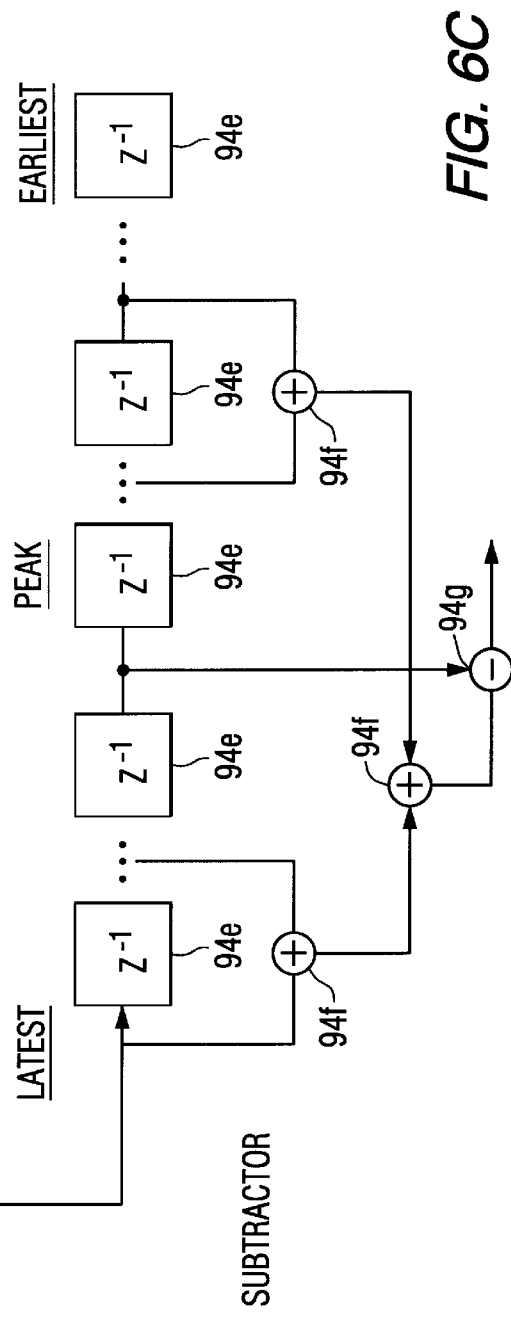
FIG. 6C

LINEAR DISTORTIONS UNDER THE DESIGNER'S CONTROL

DISCRETE EXPONENTIALLY-DECAYING RAYLEIGH FADING CHANNEL MODEL. A STOCHASTIC REALIZATION CONSISTS OF COMPLEX GAUSSIAN RV's AT EACH DISCRETE INSTANCE.

REAL SAW FILTER CHARACTERISTICS. (a) FREQUENCY RESPONSE (b) IMPULSE RESPONSE

END-TO-END MODEM FILTER RESPONSE

EXPONENTIAL DECAYING FADING EXAMPLE. A STOCHASTIC REALIZATION
FOR THE 100 NSEC RMS DELAY-SPREAD CASE IS SHOWN

100 NSEC COMBO DECIMATED TO 1 SAMP/CHIP

MODEM/CHANNEL CASCADE EXAMPLE. A STOCHASTIC REALIZATION
FOR THE 100 NSEC RMS DELAY SPREAD CASE IS SHOWN.
(a) IMPULSE RESPONSE. (b) FREQUENCY RESPONSE IN
NYQUIST BANDWIDTH (c) CORRESPONDING CONSTELLATION.

MODEM/CHANNEL CASCADE EXAMPLE. A STOCHASTIC REALIZATION FOR THE 200 NSEC RMS DELAY SPREAD CASE IS SHOWN.
(a) IMPULSE RESPONSE. (b) FREQUENCY RESPONSE IN NYQUIST BANDWIDTH.

POST CURSOR COMPONENT IS THE DOMINATE CHANNEL CHARACTERISTIC

SIGNAL POWER IN THE RECEIVER IS INFLUENCED BY THE LINK

IDEAL AGC SET-UP POSITION

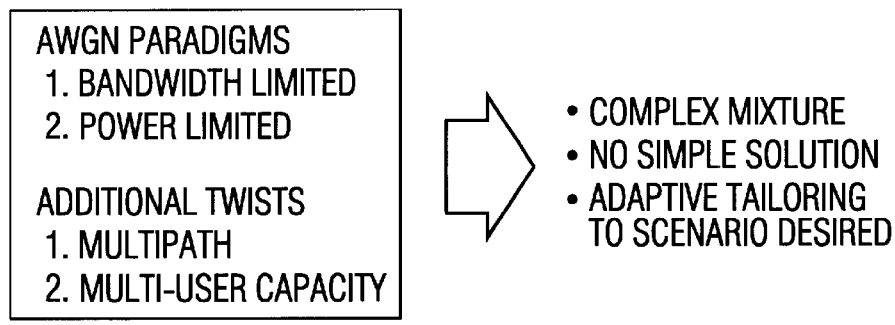
THE DOMINATE HIGH-RATE 802.11 SIGNALING VIEWPOINTS
FIG. 18
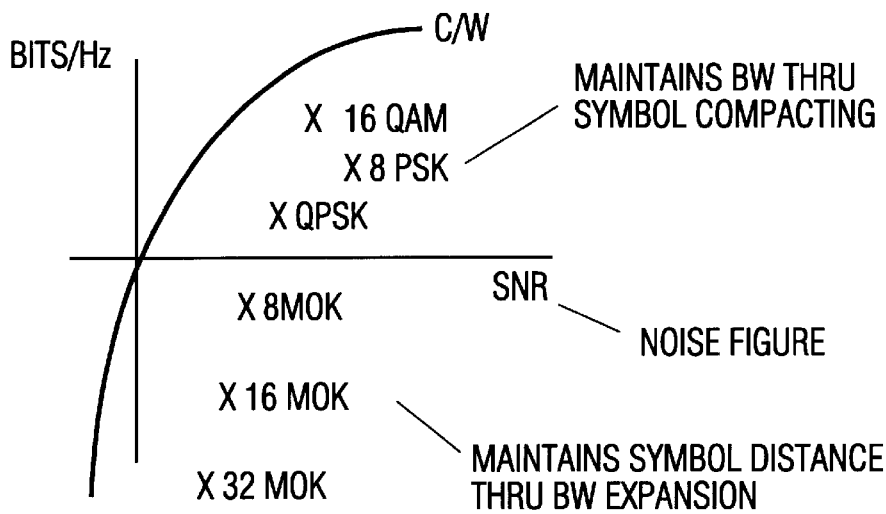
DIGITAL MODULATIONS CAPACITY COMPARISONS
AT $10^{-5}$ SYMBOL ERROR RATE
FIG. 19
| STANDARD | BANDWIDTH | PROCESSING |
|---|---|---|
| TDMA<br>IS-54/IS-136<br>GSM | NARROWBAND<br>(SNR>10dB) | DFE OR VITERBI EQUALIZER |
| CDMA<br>IS-95 | WIDEBAND<br>(SIR LOW) | RAKE |
CELLULAR/PCS SIGNALING PARADIGMS
FIG. 20

TSYM > > MULTIPATH SPREAD TO AVOID ISI

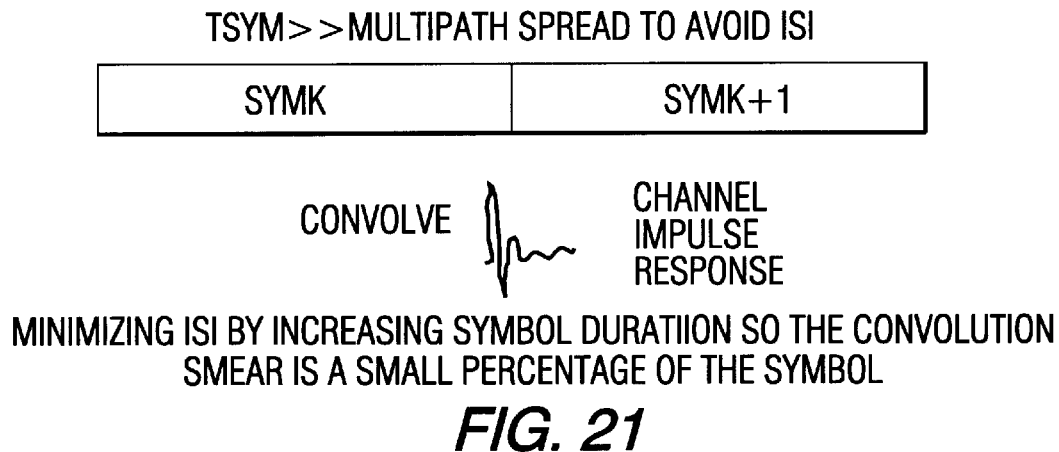

MINIMIZING ISI BY INCREASING SYMBOL DURATIION SO THE CONVOLUTION
SMEAR IS A SMALL PERCENTAGE OF THE SYMBOL

*FIG. 21*

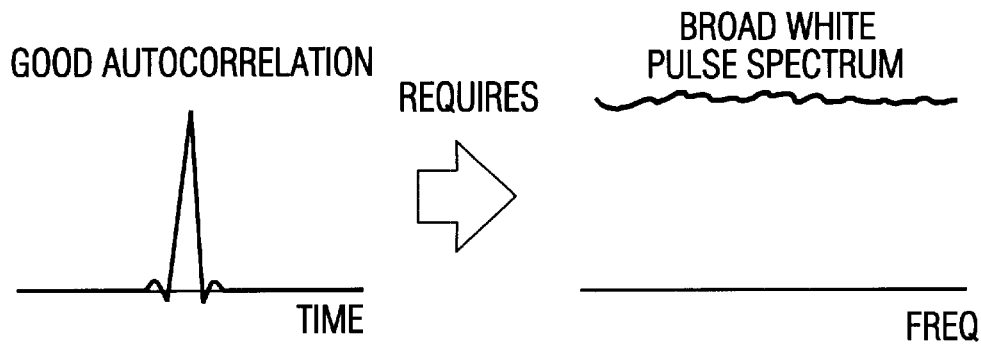

GOOD CORRELATION PROPERTIES COMSUME BANDWIDTH
WHICH LIMITS THE BITS/Hz DATA-RATE CAPACITY

*FIG. 22*

- IF SNR IS GOOD ENOUGH, CHIP-LEVEL EQUALIZATION IS POTENT
  (TDMA STANDARDS, MICROWAVE LINKS)
- DOES NOT WASTE BANDWIDTH TRYING TO ACHIEVE GOOD
  CORRELATION PROPERTIES
- ELIMINATES ISI, SO SYMBOL DURATION IS FREED
  FROM MULTIPATH-SPREAD CONSIDERATIONS
- PROCESSING CAN BE SIMPLER

KEY ADVANTAGES

*FIG. 23*

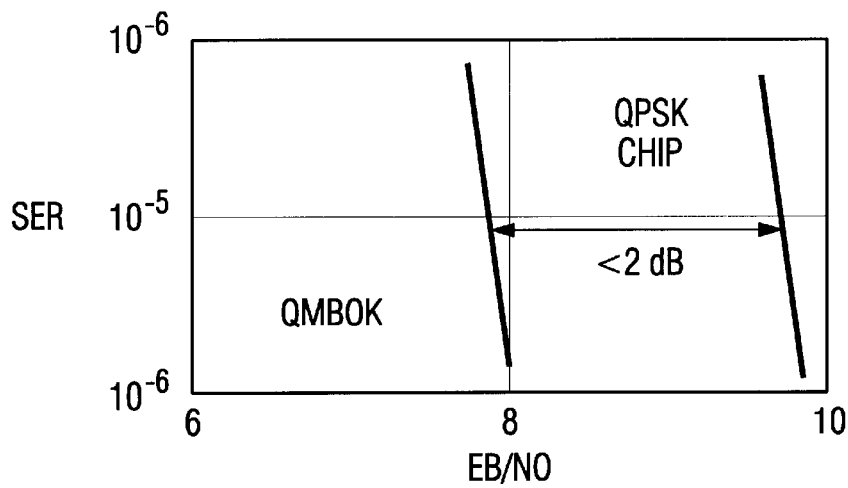
A COMPARISON OF SYMBOL ERROR RATE FOR SYMBOL LEVEL
VERSUS CHIP LEVEL PROCESSING
FIG. 24
EQUALIZER PERFORMACE
MATCHED FILTER BOUND > MLSE (VITERBI) > DECISION FEEDBACK EQUALIZER > LINEAR EQUALIZER
EQUALIZER PERFORMANCE COMPARISONS
FIG. 25
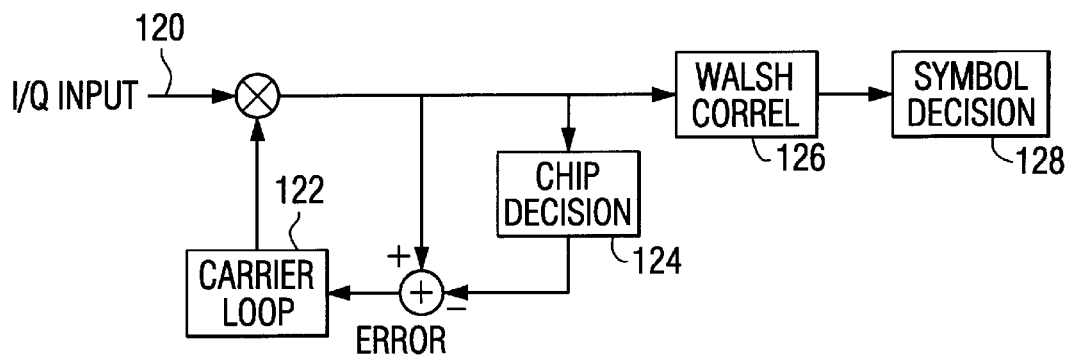
ARCHITECTURE FOR THE NO-EQUALIZER CANONICAL FORM
FIG. 26

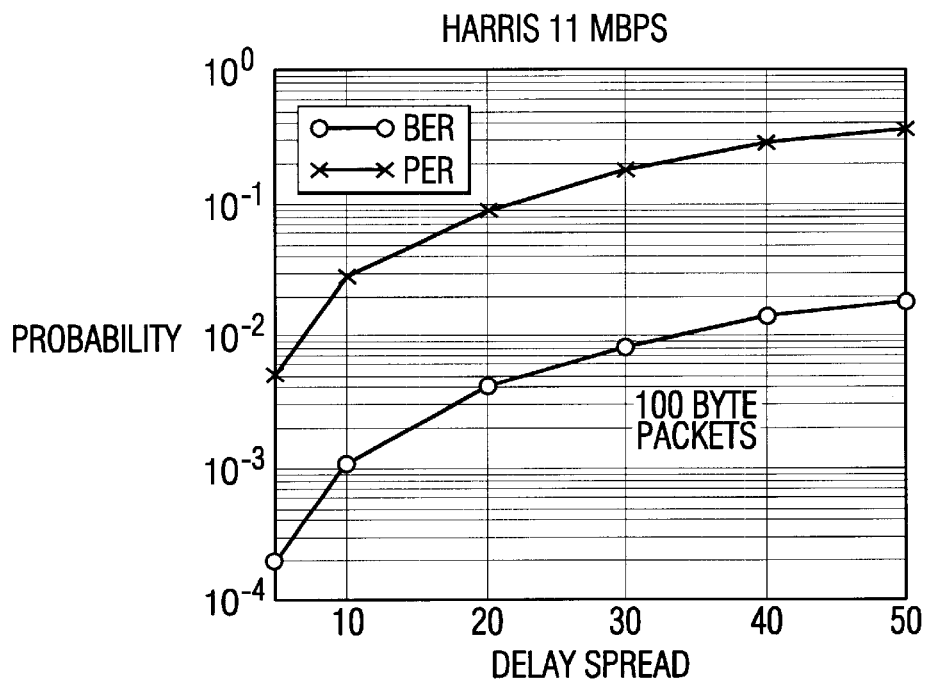

MULTIPATH PERFORMANCE FOR THE ARCHITECTURE SHOWN IN FIG. 26

*FIG. 27*

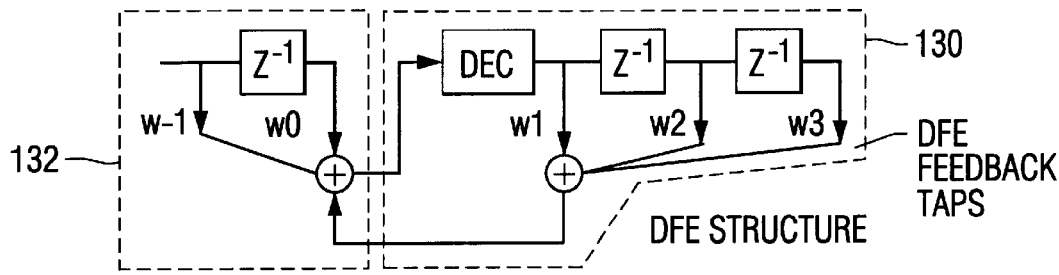

THE STRUCTURE OF A DECISION FEEDBACK EQUALIZER. THE FRONT END IS THE FEED-FORWARD SECTION, AND THE BACK-END IS THE FEEDBACK SECTION

*FIG. 28*

2x2 MATRIX FF WT CALC $$\begin{bmatrix} h0 & h\text{-}1 \\ h1 & h0 \end{bmatrix} \begin{bmatrix} w\text{-}1 \\ w0 \end{bmatrix} = \begin{bmatrix} 0 \\ 1 \end{bmatrix}$$

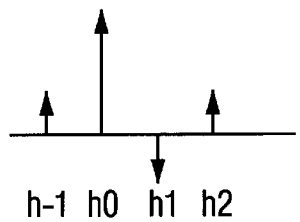

TWO TAP FEED-FORWARD DFE ZF WEIGHT CALCULATION

*FIG. 32*

TYPICAL END-TO-END IMPULSE RESPONSE AT 100 NSEC RMS DELAY

CHANNEL ZEROS FOR THE IMPULSE RESPONSE SHOWN IN FIG. 29

CHANNEL DIAGRAM EMPHASIZING TYPICAL CHARACTERISTICS

FB TAPS ONLY DEMODULATION ARCHITECTURE

PACKET ERROR RATE PERFORMANCE IN MULTIPATH FOR VARIOUS FB TAP QUANTITIES. THIS DATA WAS CALCULATED USING A WORST-CASE BOUND-CHIP EYE CLOSURE.

ARCHITECTURE INCLUDING FEEDFORWARD DFE TAPS

PACKET ERROR RATE PERFORMANCE IN MULTIPATH FOR 2 FF TAPS
AND VARIOUS FB TAPS QUANTITIES. THIS DATA WAS CALCULATED
USING A WORST-CASE BOUND-CHIP EYE CLOSURE.

PACKET ERROR RATE PERFORMANCE IN MULTIPATH FOR 3 FF TAPS
AND VARIOUS FB TAPS QUANTITIES. THIS DATA WAS CALCULATED
USING A WORST-CASE BOUND-CHIP EYE CLOSURE.

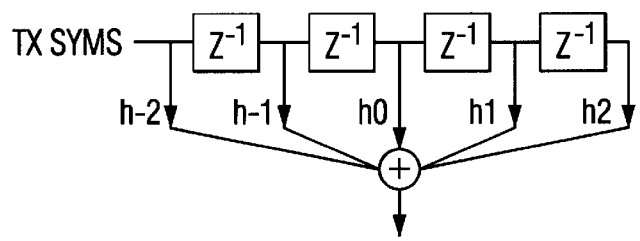
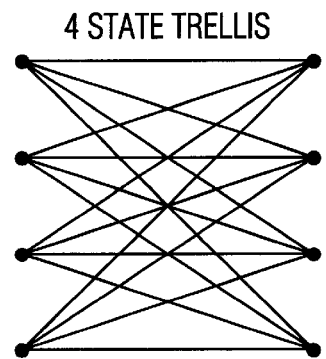
FIG. 38a     FIG. 38b
FINITE STATE MACHINE CHANNEL VIEWPOINT.
(a) THE CHANNEL IMPULSE RESPONSE FORMS FSM (b) A REPRESENTATIVE TRELLIS
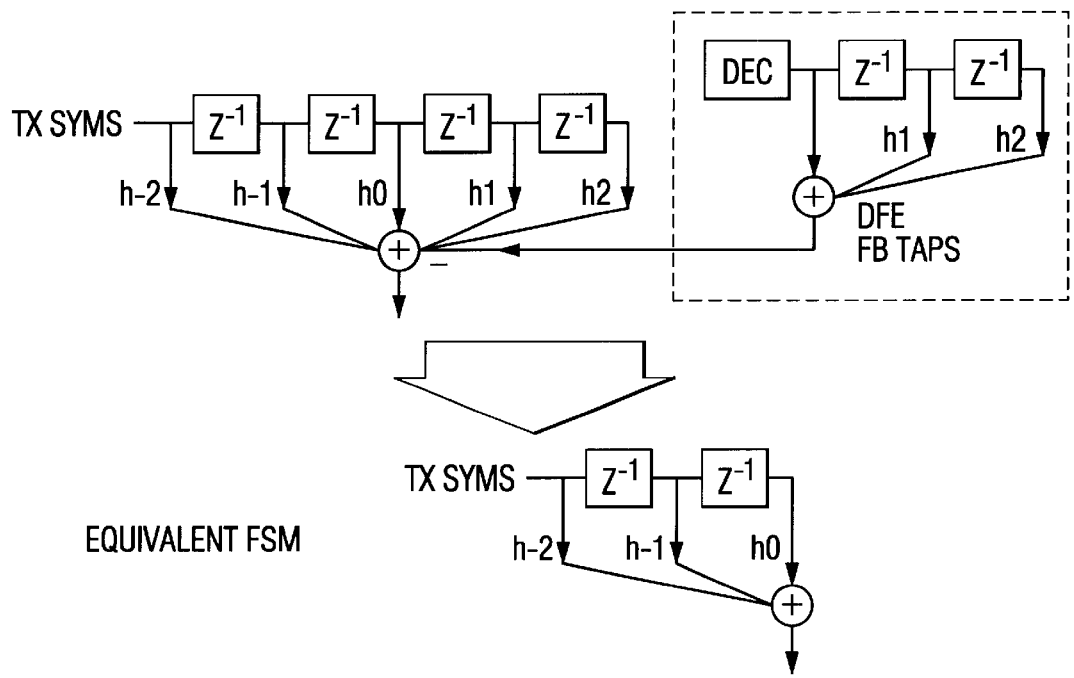
REDUCING THE COMPLEXITY OF THE FINITE-STATE-MACHINE
THROUGH DICISION FEEDBACK
FIG. 39

A PARTIAL TRACEBACK IS USED TO FEED THE DECISION FEEDBACK STAGE

VITERBI DFE PERFORMANCE VARIATION WITH INCREASING
PARTIAL TRACEBACK DELAYS

ARCHITECTURE FOR THE VITERBI-DFE

MULTIPATH-SPREAD PERFORMANCE CURVES FOR THE 4 STATE VITERBI-DFE

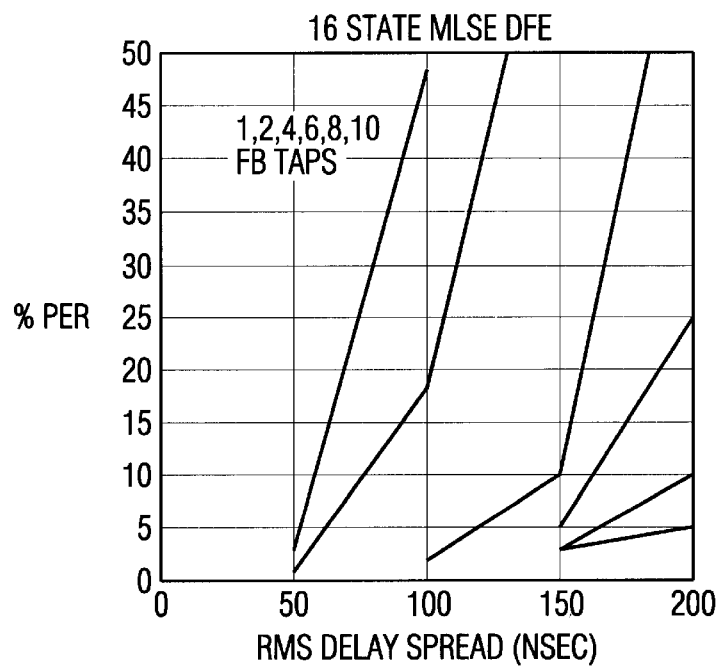

MULTIPATH-SPREAD PERFORMANCE CURVES FOR THE 16 STATE VITERBI-DFE

*FIG. 44*

| RMS MULTIPATH SPREAD | 10 % PER | 20 % PER |
|---|---|---|
| 25 | ZF DFE, 1 FB TAP | |
| 50 | ZF DFE, 2 FB TAPS | |
| 75 | ZF DFE, 2 FF AND 4 FB TAPS | ZF DFE, 4 FB TAPS |
| 100 | ZF DFE, 3 FF AND 6 FB TAPS OR 4 STATE VITERBI-DFE, 4 FB TAPS | ZF DFE, 2 FF AND 4 FB TAPS |
| 125 | 4 STATE VITERBI-DFE, 6 FB TAPS | ZF DFE, 2 FF AND 6 FB TAPS |
| 150 | 4 STATE VITERBI-DFE, 8 FB TAPS OR 16 STATE VITERBI-DFE, 4 FB TAPS | ZF DFE, 2 FF AND 8 FB TAPS |
| 175 | 16 STATE VITERBI-DFE, 7 FB TAPS | 4 STATE VITERBI-DFE, 7 FB TAPS |
| 200 | 16 STATE VITERBI-DFE, 8 FB TAPS | 4 STATE VITERBI-DFE, 8 FB TAPS |

PACKET ERROR RATE PERFORMANCE

*FIG. 45* nFF: # OF COMPLEX FF TAPS
nFB: # OF COMPLEX FB TAPS
OF REAL MULTS: 4nFF/CHIP
OF REAL ADDS: (2 nFF + 6 nFB)/CHIP
OF COMPARES: 2/CHIP

THE BASIC DFE STRUCTURE WITH MATH OPERATIONS/CHIP

| FUNCTION | GATE COUNT |
|---|---|
| DFE TRACKING STRUCTURE | 10K |
| DFE WEIGHT CALCULATION | 20K |
| CIR ESTIMATION | 5K |
| TOTAL | 35K |

GATE COUNT COMPLEXITY FOR 2 FF TAPS AND 6 FB TAPS DFE

A CHANNEL IMPULSE RESPONSE SHOWING AMPLITUDE
AND PHASE INFORMATION

SPREAD SPECTRUM TRANSCEIVER FOR USE IN WIRELESS LOCAL AREA NETWORK AND HAVING MULTIPATH MITIGATION

CROSS-REFERENCE TO RELATED APPLICATION

The present application, claims benefit U.S. Provisional Patent Application entitled "Wireless Local Area Network And Associated Methods", Application No. 60/071,659, filed Jan. 16, 1998, which is hereby incorporated by reference in its entirety. The present application is also related to the following pending U.S. Applications, entitled "Wireless Local Area Network Spread Spectrum Transceiver With Multipath Mitigation," application Ser. No. 09/231,608 filed Jan. 14, 1999; and U.S. Application entitled "Method Of Performing Antenna Diversity In A Spread Spectrum In Wireless Local Area Network," application Ser. No. 09/231,184 filed Jan. 14, 1999; both of which are commonly assigned to the same Assignee and are hereby incorporated by reference in their entireties.

FIELD OF THE INVENTION

This invention relates to the field of communication electronics, and more particularly, to a spread spectrum transceiver for use in wireless local area networks.

BACKGROUND OF THE INVENTION

Wireless or radio communication between separated electronic devices is widely used. For example, a wireless local area network (WLAN) is a flexible data communication system that may be an extension to, or an alternative for, a wired LAN within a building or campus. A WLAN uses radio technology to transmit and receive data over the air, thereby reducing or minimizing the need for wired connections. Accordingly, a WLAN combines data connectivity with user mobility, and, through simplified configurations, also permits a movable LAN.

Over the past several years, WLANs have gained acceptance among a number users including, for example, healthcare, retail, manufacturing, warehousing, and academic areas. These groups have benefitted from the productivity gains of using hand-held terminals and notebook computers, for example, to transmit real-time information to centralized hosts for processing. Today WLANs are becoming more widely recognized and used as a general purpose connectivity alternative for an even broader range of users. In addition, a WLAN provides installation flexibility and permits a computer network to be used in situations where wireline technology is not practical.

In a typical WLAN, an access point is provided by a transceiver, that is, a combination transmitter and receiver, connects to the wired network from a fixed location. Accordingly, the access transceiver receives, buffers, and transmits data between the WLAN and the wired network. A single access transceiver can support a small group of collocated users within a range of less than about one hundred to several hundred feet. The end users connect to the WLAN through transceivers which are typically implemented as PC cards in a notebook computer, or ISA or PCI cards for desktop computers. Of course the transceiver may be integrated with any device, such as a hand-held computer.

Spread spectrum communications have been used for various applications, such as cellular telephone communications, to provide robustness to jamming, good interference and multi-path rejection, and inherently secure communications from eavesdroppers, as described, for example, in U.S. Pat. No. 5,515,396 to Dalekotzin. The patent discloses a code division multiple access (CDMA) cellular communication system using four Walsh spreading codes to allow transmission of a higher information rate without a substantial duplication of transmitter hardware. U.S. Pat. No. 5,535,239 to Padovani et al., U.S. Pat. No. 5,416,797 to Gilhousen et al., U.S. Pat. No. 5,309,474 to Gilhousen et al., and U.S. Pat. No. 5,103,459 to Gilhousen et al. also disclose a CDMA spread spectrum cellular telephone communications system using Walsh function spreading codes. The disclosures of each of these patents is hereby incorporated by reference in their entirety.

It is possible to reduce multipath problems, such as with GSM cell phones using a Viterbi maximum likelihood sequence estimation (MLSE). However, applying MLSE is complex for 802.11 high data rate receivers. The Viterbi algorithm, nonetheless, if it could be applied to 802.11 spread spectrum transceivers, could provide a beneficial way to attack the multipath problem, especially if used in combination with other sources of equalization.

Viterbi encoders and detectors have been used in various electronic and digital uses, including digital communication channels, such as disclosed in U.S. Pat. No. 5,774,504, and the systems and circuits as disclosed in U.S. Pat. Nos. 5,841,819 and 5,844,741, the disclosures which are hereby incorporated by reference in their entirety.

The assignee of the present invention has used Viterbi algorithm and decoders, such as disclosed in U.S. Pat. Nos. 4,545,054 and 4,346,473, the disclosures which are hereby incorporated by reference in their entirety.

SUMMARY OF THE INVENTION

It is therefore an object of the present invention to provide a spread spectrum transceiver having a base band processor and demodulation that may use the Viterbi algorithm with feedback equalization.

In accordance with the present invention, a method of the present invention demodulates a spread spectrum signal and comprises the steps of receiving within a demodulator of a spread spectrum receiver, a spread spectrum phase shift keyed (PSK) modulated information signal on a signal channel. The information signal includes a sequence of data symbols formed from a plurality of high rate mode chips. The method also comprises the step of Viterbi decoding a precursor portion of the signal channel and forming a multi-state trellis having a predetermined number of states. The method also comprises the step of feedback equalizing a post-cursor portion of the signal channel with a finite impulse response filter having feedback taps operatively connected to a chip detector circuit that tracks high rate mode chips and a carrier loop circuit for phase and frequency tracking. The method also comprises the step of despreading the information signal within the spread spectrum code function correlator.

In still another aspect of the present invention, the method comprises the step of performing a partial signal trace back of the multi-state trellis to the feedback taps of the finite impulse response filter. The method also comprises the step of passing a signal trace back from a Viterbi detector circuit to the spread spectrum code function correlator. The method also includes a sequence of data symbols formed from a plurality of high rate mode chips. The signal channel forms a finite state machine and further comprises the step of establishing a predetermined number of states within the multi-state trellis.

In accordance with the present invention, a spread spectrum radio transceiver is disclosed and includes a base band processor and radio circuit connected thereto. The base band processor includes a demodulator for spread spectrum phase shift keying (PSK) demodulating an information signal on a signal channel. The information signal includes data symbols formed from a plurality of high rate mode chips forming a spread spectrum information signal. The demodulator comprises at least one spread spectrum code function correlator for decoding the information according to a predetermined orthogonal code sequence. A Viterbi decoder receives the information signal and decodes a precursor portion of the signal channel. A carrier loop circuit allows for phase and frequency tracking of the information signal. A chip decision circuit is operative with a carrier loop circuit and tracks high rate chips.

A decision feedback equalizer is formed from a finite impulse response filter and operative with the chip decision circuit and carrier loop circuit. This equalizer has a plurality of feedback taps and at least one feedback tap is selected for logical add/subtract operations for equalizing a post-cursor portion of the signal channel. A modulator spread spectrum PSK modulates information for transmission via the radio circuit. The modulator comprises at least one code function encoder for encoding information according to an orthogonal code sequence. The at least one spread spectrum code function correlator comprises a Walsh correlator. The Viterbi decoder can further comprise means for generating a trace back soft decision to the spread spectrum code function correlator. The Viterbi decoder can further comprise means for generating a partial trace back to predetermined feedback paths of the finite impulse response filter. The carrier loop circuit can also include a carrier numerically controlled oscillator (NCO). A carrier NCO control circuit selectively operates the carrier NCO based upon a carrier phase of the carrier loop circuit.

BRIEF DESCRIPTION OF THE DRAWINGS

Other objects, features and advantages of the present invention will become apparent from the detailed description of the invention which follows, when considered in light of the accompanying drawings in which:

FIG. 1H illustrates four modulation modes of an extended modulation package.

FIG. 6C is a block circuit diagram of a portion of the demodulator circuit in FIG. 1A that determines bit sync peak sample and subtracts a predetermined number of bit sync samples.

FIG. 18 illustrates various viewpoints that dominate high-rate 802.11 signaling.

FIG. 19 is a graph illustrating a digital modulations capacity comparison at $10^{-5}$ symbol error rate.

FIG. 20 is a chart illustrating cellular/PCS signaling paradigms.

FIG. 21 is a graphical chart illustrating how the ISI is minimized by increasing symbol duration so the convolution smear is a small percentage of the symbol.

FIG. 22 is a graph illustrating good correlation properties that consume bandwidth.

FIG. 23 illustrates key advantages using chip-level equalization.

FIG. 24 is a graph illustrating a comparison of the symbol error rate with the symbol level versus chip level processing.

FIG. 25 is a chart illustrating equalizer performance comparisons.

FIG. 26 is a simplified block diagram for the demodulator architecture that is generically shown in FIGS. 1A–1F.

FIG. 27 is a graph showing the multipath performance for the architecture shown in FIG. 26.

FIG. 28 is a circuit block diagram of a decision feedback equalizer that can be used in the present invention, and illustrating a feed-forward section and a feedback section.

FIG. 32 illustrates a two tap feed-forward DFE ZF weight calculation.

FIG. 38A illustrates a finite state machine channel viewpoint with a channel impulse response that forms FSM and FIG. 38B represents a representative trellis.

FIG. 39 illustrates how the complexity of the finite-state-machine can be reduced through decision feedback.

FIG. 44 is a graph illustrating the multipath-spread performance curves for 16 state viterbi/DFE.

FIG. 45 is a chart illustrating packet error rate performance for various RMS multipath spread with different taps.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

General Technical Background

For purposes of description and understanding, a basic spread spectrum radio transceiver is described in detail below to give a technical background of the present invention. The spread spectrum transceiver and related information as described relative to FIGS. 1A–1H, concerns a basic spread spectrum radio transceiver with a high rate capability used in a wireless local area network. Naturally, the present invention is not limited to such a transceiver, which only is illustrated and described for purposes of technical understanding. Such a transceiver is described further in U.S. Pat. No. 5,482,807, by the present assignee, the disclosure which is hereby incorporated by reference in its entirety.

Figure 1A:
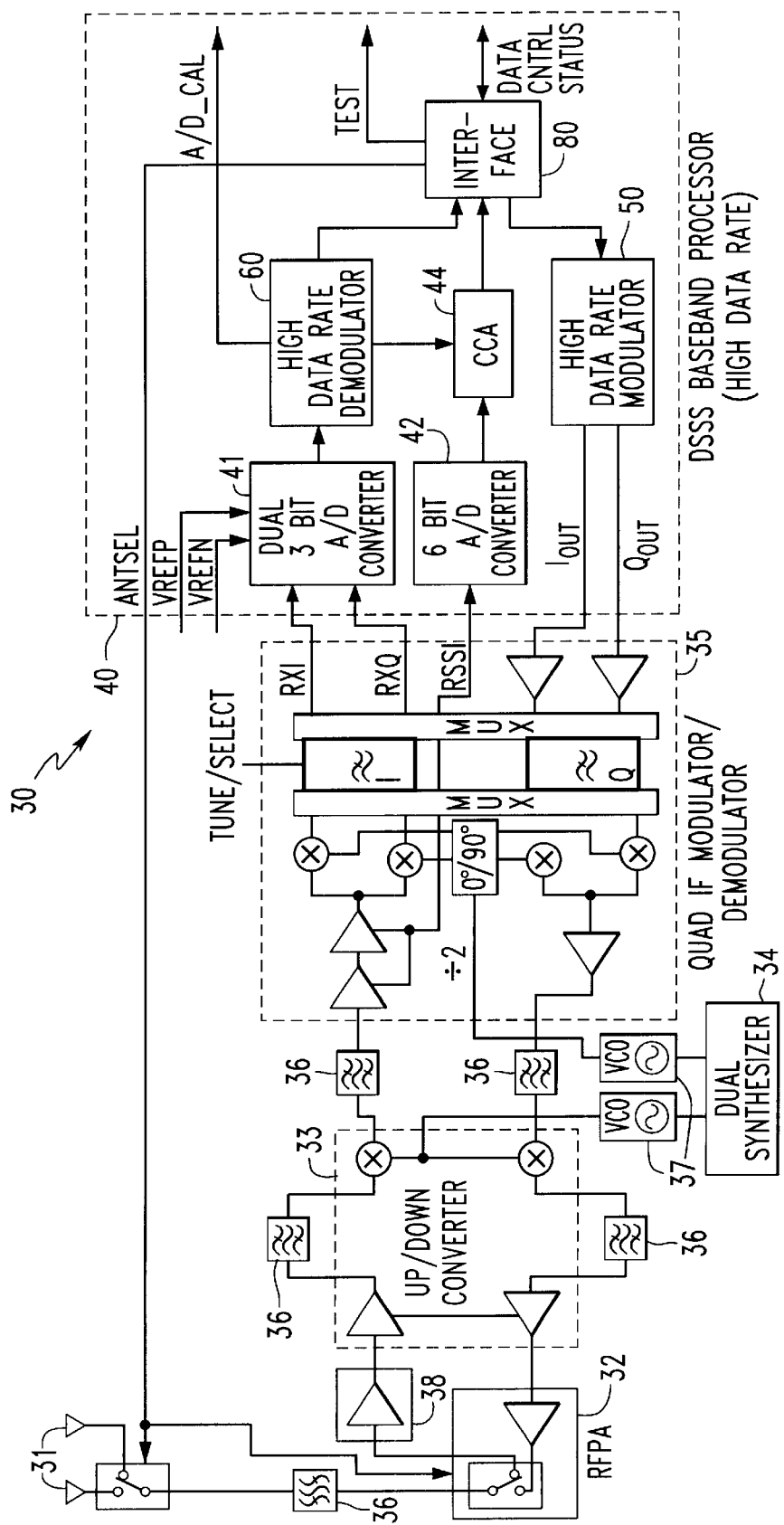
FIG. 1A shows the basic circuit components of a spread spectrum transceiver.

Referring to FIG. 1A, a basic wireless transceiver 30 is shown that can be modified in accordance with the present invention. The transceiver 30 may be readily used for WLAN applications in the 2.4 GHz ISM band in accordance with the proposed IEEE 802.11 standard. The transceiver 30 includes selectable antennas 31 coupled to the radio power amplifier and TX/RX switch 32 as may be provided by a Harris part number HFA3925. As would be readily understood by those skilled in the art, multiple antennas are provided for space diversity reception.

A low noise amplifier 38, as may be provided by Harris part number HFA3424, is also operatively connected to the antennas. The illustrated up/down converter 33 is connected to both the low noise amplifier 38 and the RF power amplifier and TX/RX switch 32 as would be readily understood by those skilled in the art. The up/down converter 33 may be provided by a Harris part number HFA3624, for example. The up/down converter 33, in turn, is connected to the illustrated dual frequency synthesizer 34 and the quad IF modulator/demodulator 35. The dual synthesizer 34 may be a Harris part number HFA3524 and the quad IF modulator 35 may be a Harris part number HFA3724. All the components described so far are included in a 2.4 GHz direct sequence spread spectrum wireless transceiver chip set manufactured by Harris Corporation under the designation PRISM 1. Various filters 36, and the illustrated voltage controlled oscillators 37 may also be provided as would be readily understood by those skilled in the art and as further described in the Harris PRISM 1 chip set literature, such as the application note No. AN9614, March 1996, the entire disclosure of which is incorporated herein by reference.

Turning now more particularly to the right hand side of FIG. 1A, a high data rate direct sequence spread spectrum (DSS) baseband processor 40 is now described. The conventional Harris PRISM 1 chip set includes a low data rate DSS baseband processor available under the designation HSP3824. This prior baseband processor is described in detail in a publication entitled "Direct Sequence Spread Spectrum Baseband Processor, March 1996, file number 4064.4, and the entire disclosure of which is incorporated herein by reference.

Like the HSP3824 baseband processor, the high data rate baseband processor 40 of the invention contains all of the functions necessary for a full or half duplex packet baseband transceiver. The processor 40 has on-board dual 3-bit A/D converters 41 for receiving the receive I and Q signals from the quad IF modulator 35. Also like the HSP3824, the high data rate processor 40 includes a receive signal strength indicator (RSSI) monitoring function with the on-board 6-bit A/D converter and CCA circuit block 44 provides a clear channel assessment (CCA) to avoid data collisions and optimize network throughput as would be readily understood by those skilled in the art.

An extension of the PRISM 1 product from 1 Mbit/s BPSK and 2 Mbit/s QPSK to 5.5 Mbit/s BPSK and 11 Mbit/s QPSK is provided. This is accomplished by keeping the chip rate constant at 11 Mchip/s. This allows the same RF circuits to be used for higher data rates. The symbol rate of the high rate mode is 11 MHZ/8=1.375 Msymbol/s.

As an example, the 5.5 Mbit/s mode, the bits are scrambled and then encoded from 4 bit nibbles to 8 chip modified Walsh functions. This mapping results in bi-orthogonal codes which have a better bit error rate (BER) performance than BPSK alone. The resulting 11 Mchip/s data stream is BPSK modulated. The demodulator comprises a modified Walsh correlator and associated chip tracking, carrier tracking, and reformatting devices as described in greater detail below.

For the 11 Mbit/s mode, the bits are scrambled and then encoded from 4 bit nibbles to 8 chip modified Walsh functions independently on each I and Q rail. There are 8 information bits per symbol mapped to 2 modified Walsh functions. This mapping results in bi-orthogonal codes which have better BER performance than QPSK alone. The resulting two 11 Mchip/s data streams are QPSK modulated.

The theoretical BER performance of this type of modulation is approximately $10^{-5}$ at an Eb/No of 8 dB versus 9.6 dB for plain BPSK or QPSK. This coding gain is due to the bi-orthogonal coding. There is bandwidth expansion for all of the modulations to help combat multi-path and reduce the effects of interference.

Figure 1B:
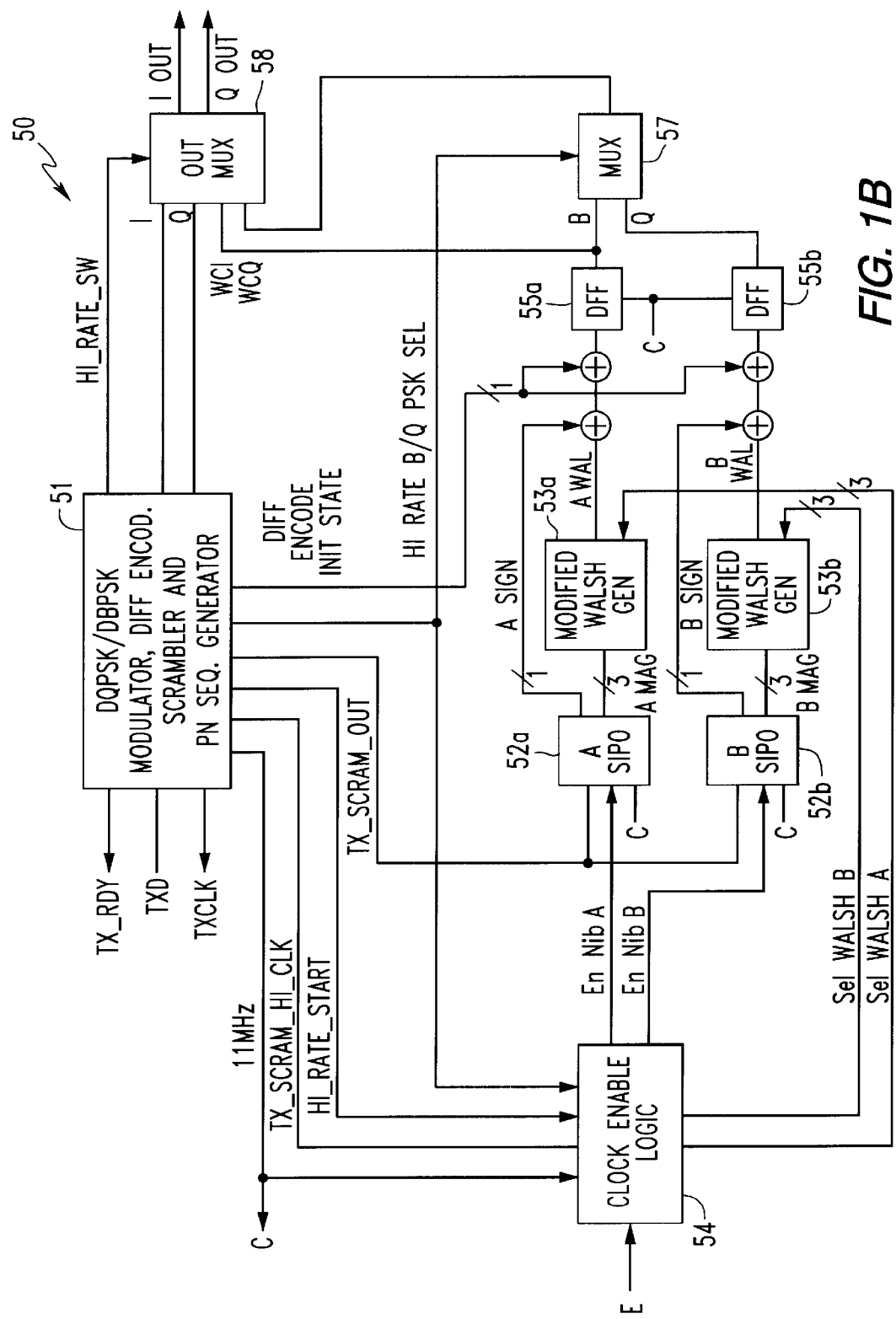
FIG. 1B is a schematic circuit diagram of a modulator portion of a high data rate base band processor that can be used with modifications with the present invention.

Referring additionally to FIG. 1B, the output of the QPSK/BPSK modulator and scrambler circuit 51 is partitioned into nibbles of Sign-Magnitude of 4 bits, with the least significant bit (LSB) first. For QPSK, 2 nibbles are presented in parallel to the Modified Walsh Generators 53a, 53b—the first nibble from the B serial-in/parallel-out SIPO circuit block 52b and the second from A SIPO 52a. The two nibbles form a symbol of data. The bit rate may be 11 Mbit/s as illustrated. Therefore, the symbol rate is 1.375 Mbit/s (11/8=1.375). For BPSK, nibbles are presented from the A SIPO 52a only. The B SIPO 52b is disabled. A nibble forms a symbol of data. The bit rate in this instance is 5.5 Mbit/s and the symbol rate remains 1.375 Mbit/s (5.5/4=1.375).

The Magnitude part of the SIPO output points to one of the Modified Walsh Sequences shown in the table below, along with the basic Walsh sequences for comparison.

| MAG | BASIC WALSH | MODIFIED WALSH |
|---|---|---|
| 0 | 00 | 03 |
| 1 | 0F | 0C |
| 2 | 33 | 30 |
| 3 | 3C | 3F |
| 4 | 55 | 56 |
| 5 | 5A | 59 |
| 6 | 66 | 65 |
| 7 | 69 | 6A. |

The Sel Walsh A, and Sel Walsh B bits from the clock enable logic circuit 54 multiplex the selected Walsh sequence to the output, and wherein the LSBs are output first. The A Sign and B Sign bits bypass the respective Modified Walsh Generators 53a, 53b and are XOR'd to the sequence.

As would be readily understood by those skilled in the art, there can be other possible mappings of bits to Walsh symbols. In addition, the Modified Walsh code may be generated by modulo two adding a fixed hexadecimal code to the basic or standard Walsh codes to thereby reduce the average DC signal component and thereby enhance overall performance.

The output of the Diff encoders of the last symbol of the header CRC is the reference for the high rate data. The header may always be BPSK. This reference is XOR'd to I and Q signals before the output. This allows the demodulator 60, as described in greater detail below, to compensate for phase ambiguity without Diff decoding the high rate data. Data flip flops 55a, 55b are connected to the multiplexer, although in other embodiments the flip flops may be positioned further downstream as would be readily understood by those skilled in the art. The output chip rate is 11 Mchip/s. For BPSK, the same chip sequence is output on each I and Q rail via the multiplexer 57. The output multiplexer 58 provides the selection of the appropriate data rate and format.

Figure 1C:
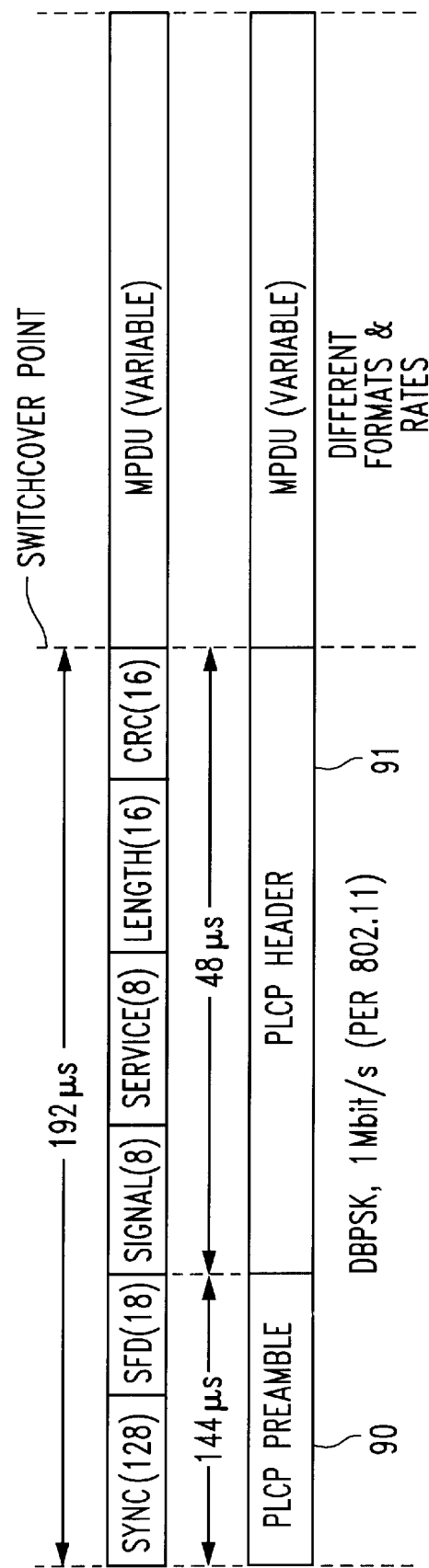
FIG. 1C is a timing diagram of signals that can be generated by the circuits shown in FIGS. 1A and 1B.

Referring now additionally to FIG. 1C, a timing and signal format for the interface 80 is described in greater detail. Referring to the left hand portion, Sync is all 1's, and SFD is F3AOh for the PLCP preamble 90. Now relating to the PLCP header 91, the SIGNAL is:

| | |
|---|---|
| OAh | 1 Mbit/s BPSK, |
| 14h | 2 Mbit/s QPSK, |
| 37h | 5.5 Mbit/s BPSK, and |
| 6Eh | 11 Mbit/s QPSK. |

The SERVICE is OOh, the LENGTH is XXXXh wherein the length is in $\mu$s, and the CRC is XXXXh calculated based on SIGNAL, SERVICE and LENGTH. MPDU is variable with a number of octets (bytes).

The PLCP preamble and PLCP header are always at 1 Mbit/s, Diff encoded, scrambled and spread with an 11 chip barker. SYNC and SFD are internally generated. SIGNAL, SERVICE and LENGTH fields are provided by the interface 80 via a control port. SIGNAL is indicated by 2 control bits and then formatted as described. The interface 80 provides the LENGTH in $\mu$s. CRC in PLCP header is performed on SIGNAL, SERVICE and LENGTH fields.

MPDU is serially provided by Interface 80 and is the variable data scrambled for normal operation. The reference phase for the first symbol of the MPDU is the output phase of the last symbol of the header for Diff Encoding. The last symbol of the header into the scrambler 51 must be followed by the first bit of the MPDU. The variable data may be modulated and demodulated in different formats than the header portion to thereby increase the data rate, and while a switchover as indicated by the switchover point in FIG. 1C, occurs on-the-fly.

Figure 1D:
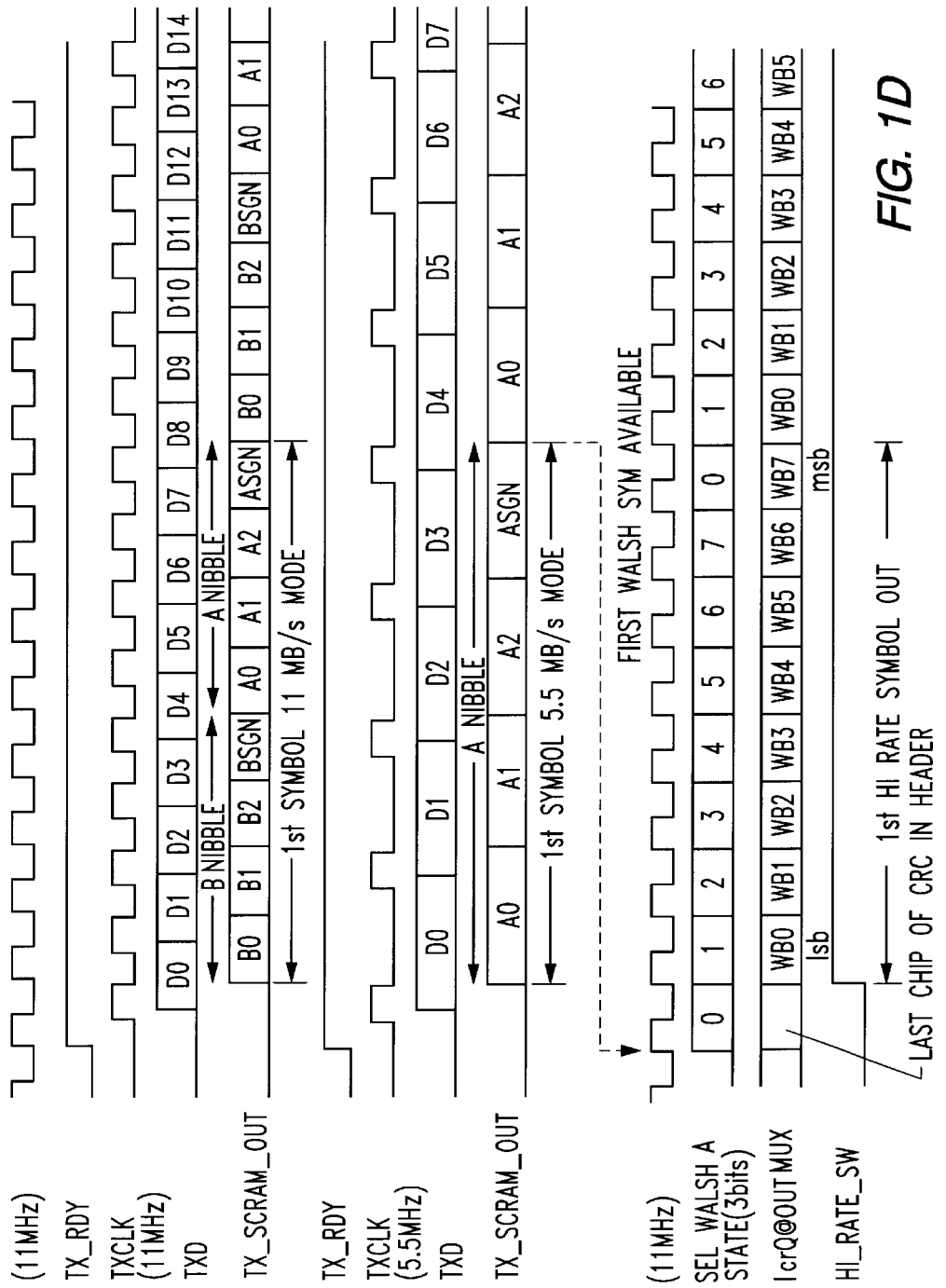
FIG. 1D is a timing diagram of additional signals that can be generated by the circuits of FIGS. 1A and 1B.

Turning now additionally to FIG. 1D, the timing of the high data rate modulator 50 may be further understood. With the illustrated timing, the delay from $TX_{13}RDY$ to the first Hi Rate Output Chip is≈ten 11 MHZ clock periods or 909.1 ns. The other illustrated quantities will be readily appreciated in view of the above description.

Figure 1E:
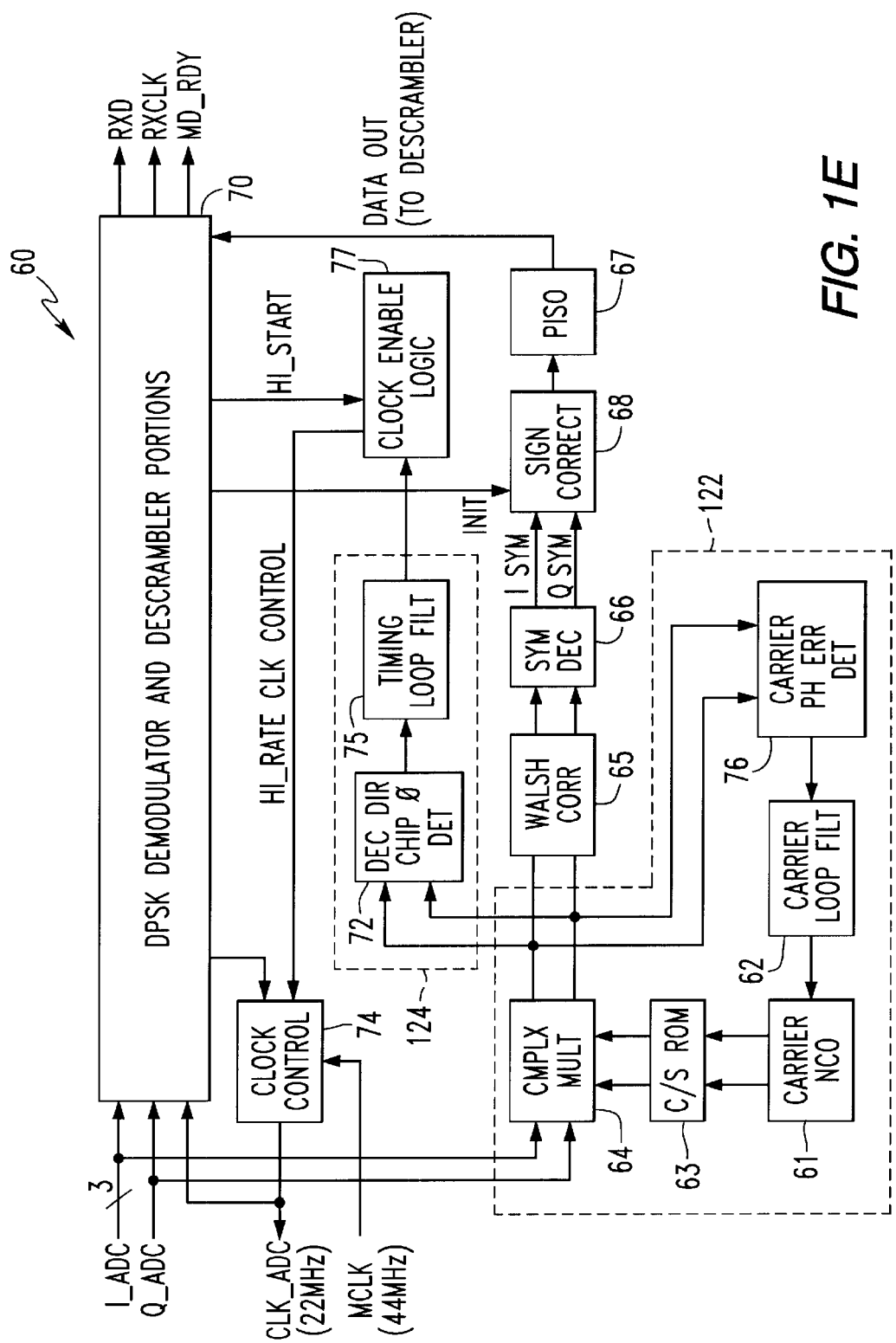
FIG. 1E is a schematic circuit diagram of a demodulator portion of the base band processor shown in FIG. 1A.

Referring now to FIG. 1E, the high data rate demodulator 60 is further described. The high rate circuits are activated after the signal field indicates 5.5 or 11 Mbit/s operation. A carrier loop circuit is indicated by dotted lines 122, a chip detection circuit is indicated by dotted line 124. At a certain time, the start phase is jammed into the Carrier NCO 61 and the start frequency offset is jammed into the Carrier Loop Filter 62. The signal is frequency translated by the C/S ROM 63 and the Complex Multiplier 64 and passed to the Walsh Correlator 65. The correlator 65 output drives the Symbol Decision circuits 66, as illustrated. The output of the Symbol Decision circuits 66 are serially shifted by the parallel-in/serial-out SIPO block 67 to the descrambler portion of the PSK Demodulator and Scrambler circuit 70 after passing through the Sign Correction circuit 68 based on the last symbol of the header. The timing of the switch over desirably makes the symbol decisions ready at the correct time.

The signal is phase and frequency tracked via the Complex Multiplier 64, Carrier NCO 61 and Carrier Loop Filter 62. The output of the Complex Multiplier 64 also feeds the Carrier Phase Error Detector 76. A decision directed Chip Phase Error Detector 72 feeds the illustrated Timing Loop Filter 75 which, in turn, is connected to the Clock Enable Logic 77. A decision from the Chip Phase Error Detector 72 is used instead of early-late correlations for chip tracking since the SNR is high. This greatly reduces the additional circuitry required for high rate operation. The 44 MHZ master clock input to the Clock Control 74 will allow tracking high rate mode chips with ±⅛ chip steps. Only the stepper is required to run at 44 MHZ, while most of the remaining circuits run at 11 MHZ. The circuit is only required to operate with a long header and sync.

Figure 1F:
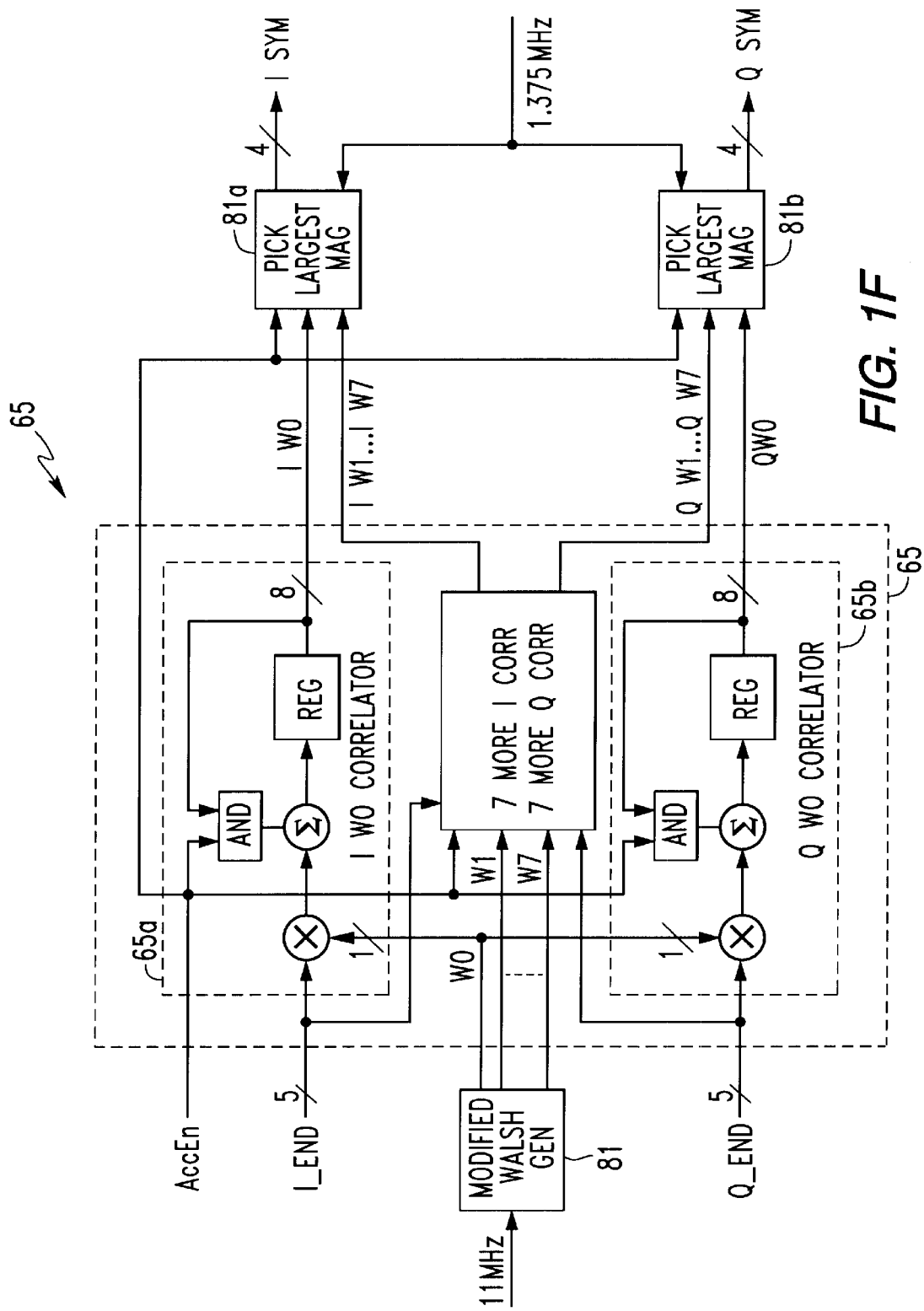
FIG. 1F is a schematic circuit diagram of a correlator portion of the demodulator of FIG. 1A.

Turning now additionally to FIG. 1F, a pair of Walsh Correlators 65a, 65b is further described. The I_END and Q_END inputs from the chip tracking loop are input at 11 MHZ. The Modified Walsh Generator 81 produces the 8 Walsh codes (W0 to W7) serially to sixteen parallel correlators (8 for I_END and 8 for Q_END). The sixteen correlations are available at a 1.375 MHZ rate. The Walsh Codes (W0 to W7) are the same as listed in the table above for the high data rate modulator. For the 11 Mbit/s mode, the largest magnitude of I W0 to I W7 is selected by the Pick Largest Magnitude circuit 81a to form I sym. I sym is formatted in Sign-Magnitude. The Magnitude is the Modified Walsh Index (0 to 7) of the largest Correlation and Sign is the sign bit of the input of the winning Correlation. The Q channel is processed in parallel in the same manner. For the 5.5 Mbit/s mode, the largest magnitude of I W0 to I W7 is selected to form Isym. In this case, only I sym is output. AccEn controls the correlator timing and is supplied by timing and control circuits.

Figure 7:
FIG. 7 illustrates a block diagram showing key system components that induce end-to-end linear distortion.
Figure 8:
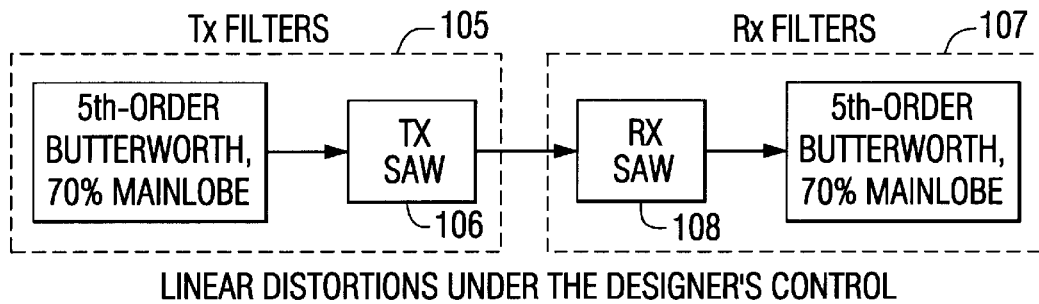
FIG. 8 is a block diagram showing linear distortions for transmit and receive filters.

Other details of the carrier tracking loop (also known as the carrier loop circuit) and chip tracking loop are shown in FIGS. 7 and 8 of the incorporated by reference, U.S. Pat. No. 5,982,807.

As noted above, orthogonal keying has been described. M-ary bi-orthogonal keying is one modulation choice for high rates in the 2.4 GHz ISM band. This technique can easily be made interoperable with the existing 802.11 networks by incorporating the same preamble and header which already has a rate change mechanism. The M-ary bi-orthogonal keying (MBOK) modulation is well known to those skilled in the art.

As is known to those skilled in the art, MBOK allows multi-channel operation in the ISM band by virtue of keeping the total spread bandwidth the same as the existing 802.11 standard. The spreading is actually more uniform than the 802.11 Barker words, but it has the same chipping rate and the same basic spectrum shape. The spectrum is filtered to 17 MHZ at the 3 dB points and to 35 dB beyond 22 MHZ. This allows placing three non-interfering channels in the ISM band (which is from 2.40 to 2.483 GHz) with allowance for spectral energy reduction at the band edges. With more aggressive filtering, four channels could be squeezed into the band.

MBOK is a power efficient modulation and provides good range for the higher data rates. It is robust, having good tolerance for interference and multipath. M-ary orthogonal keying (MOK) can be shown to be a generalization of many standard waveforms such as FSK.

Figure 1G:
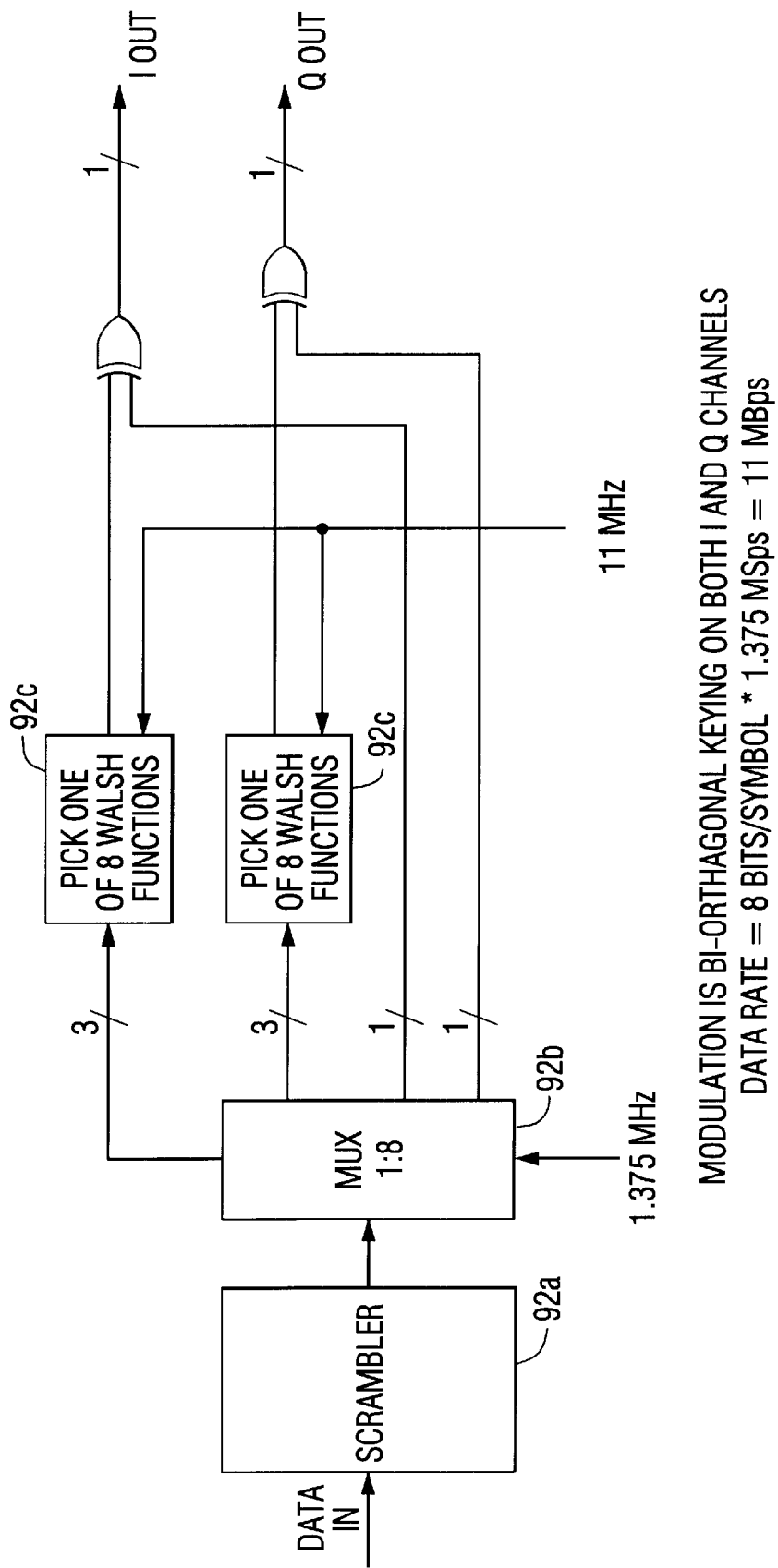
FIG. 1G is a block diagram of components illustrating how a waveform for M-ary orthogonal keying (MOK) can be generated.

FIG. 1G shows how the waveform is created. Data enters scrambler 92a and enters 1:8 multiplexer 92b (for Walsh functions). Walsh function select circuits 92c select one of eight Walsh functions. In this scheme, the spread function is picked from a set of M orthogonal vectors by the data word. Since the I and Q channels can be considered independent when coherently processed, both can be modulated this way. Bi-orthogonal keying extends this by using both true and inverted versions of the spread functions. This allows the circuits to pack 8 bits into each symbol.

As an example, well known orthogonal vector set is the Walsh function set. It is available for 8 chip (powers of 2) vectors and has true orthogonality. Modifications to the basic set can be made by adding another fixed bit pattern to it. This might be done, for example, to avoid the all 0's member of the basic set.

FIG. 1H illustrates four modulation modes of the extended modulation package. The two 802.11 1 and 2 MBps modes are shown as basically setting the polarity of the I and/or Q channel spreading function. For the 5.5 MBps mode, the incoming data is grouped into four bit nibbles where three of those bits select the spreading function out of the set of 8 while the fourth bit sets the polarity. The spreading sequence chosen then BPSK modulates the carrier by driving the I and Q modulators in parallel. To make 11 MBps modulation, the input data is grouped into two nibbles and used to modulate the I and Q channels independently.

To make the modulation have the same bandwidth as an existing 802.11 DS modulation, the chipping rate can be kept at 11 Mcps while the symbol rate can be increased to 1.375 MSps. This makes the overall bit rate 11 MBps. This also makes it easy to make the system interoperable with the 802.11 preamble and header. Since the spread rate remains constant, the only thing that changes when transitioning into the data from the header is the data clock rate.

MOK modulation has been shown to have slightly (1.6 dB) better Eb/NO performance than BPSK due to embedded coding properties. This allows the modulation to tolerate more interference than other waveforms. Since there are more bits per symbol with this modulation, it naturally requires more Es/NO than BPSK, but the increase is minimized.

The spectrum of this waveform is sinx/x, which is the same as the 802.11 waveform.

The multipath performance will depend on the SNR and phase distortion tolerance of the waveform.

Antenna diversity is desired to insure a reliable 11 MBps link. The high rate modulation is more susceptible to multipath interference and filter distortion than lower rate modulations would be due to the higher required SNR.

The MBOK modulation when used in a BPSK fashion achieves 5.5 MBps. By using the MBOK scheme on both the quadrature I and Q channels (which are independent), the basic data rate can be doubled to 11 MBps. This also allows options for lower rates which are more robust, giving fall back rates for stressed links. The excellent range that the m-ary bi-orthogonal keying modulation achieves is due to the fact that MBOK has better than BPSK performance.

Antenna Diversity Advantage

Antenna diversity is important to go about deciding which is the best antenna, such as when two antennae are situated in a circuit board. It has been known that it is possible to demodulate the data off two antennas that are typically positioned on a circuit board, such as well known to those skilled in the art. The circuits of a spread spectrum transceiver would then determine which antenna came out with the "cleaner" set of data. However, in many prior art systems, this would require two receivers. Thus, it is necessary to obtain a good diversity selection metric.

Typically, a laptop computer used in a WLAN configuration would have two antennas that are formed as rubber coated antennas, as known to those skilled in the art. These antennae could stick out from the board. There have been various designs for antenna diversity, such as antennas that pull out and turn to the side, or that permanently stick out. With two antennas, it is necessary to determine what antenna to pick. One known way is to use the signal-to-noise ratio (SNR) to pick the required antenna.

However, in a large office environment with many doors and walls, the environment is similar to an echo chamber. The signal that is best for the receiver may not be the largest signal and this largest signal may not be the best signal element in terms of demodulating the signal. All signs could be corrupted by multipath. Thus, the signals subtract and could make a signal weaker and a previous algorithm using the SNR would be appropriate. However, if the multipath made a more powerful, corrupted signal, then the algorithm using an SNR to obtain the highest signal would not be the best. The actual demodulated signal would be a more corrupted signal, even though it had greater energy.

It is desirable to find the least corrupt signal, and not the highest power signal. The present invention uses a correlation technique to decide what is the best, least corrupt signal to demodulate, instead of looking only at the greatest power signal as in prior art techniques.

From a correlator, one always obtains a noise signal and an impulse signal when using this particular type of spread spectrum waveform that is repeated, as known to those skilled in the art, in spread spectrum technology. Echoes are obtained, and if one of the echoes is strong, the echo could be used as the desired signal. For example, because a signal is passing through the wall, it could be weak. But that one signal that bounced out of the door off the wall could be a stronger signal. Each of those signals and the corrupted signal which proceeds and comes after the signal could be tracked. The signal going through the wall could be the desired signal to demodulate even though it is the weaker signal.

The present invention comprises a method and associated circuitry that uses the taps out of the correlator to determine the better signal. For example, there could be a tap of 22 samples in each of the sample intervals. The sample used for demodulation is one that falls on the correlation peak in time. The algorithm takes samples before the peak and samples after the peak, sums them together (compares and subtracts them from the peak so that there is a measure done with the different antennas). The cleaner is then picked.

Basically, the system looks to the left and right of reference and does a subtraction to obtain the cleaner signal. It is a diversity scheme to determine which of two antennas are better for receiving the next signal. It could also be accomplished for transmitting the next signal because if reception is good, then the path back is generally also good, although that is not always guaranteed. The metric gives an advantage to multipath corrupt environments.

As to measurements, they have been accomplished on Barker codes. It is possible to make a decision whether a Walsh or other similar signal is good not based solely on the Barker codes. It is possible to use an additional second antenna diversity period to refine an estimate of what is the better signal. Thus, it is possible to improve the performance of the diversity scheme.

The advantages of antenna diversity are derived from the fact that two sufficiently physically separated antennas usually result in non-completely correlated channels. The dimensions of a laptop (12") provides sufficient physical separation for significant antenna diversity performance gain, although for most near term applications, only the access point and perhaps desktop PCs will have diversity to minimize cost. The coming integration of wireless network hardware into laptops will isolate the user from antenna wiring.

The actual performance gain achieved is highly dependent upon the details of the operational environment. In the limit, if the channels are uncorrelated, and the best antennas accurately chosen, the mixed message rate can be raised to the power of the number of independent paths. For example, a 50% missed message rate could, with dual receive diversity, theoretically be reduced to 25%, and with dual transmit and receive diversity to 6.25%. Antenna diversity also reduces the probability of "dead spots," which are very annoying to users.

Antenna diversity complexity and performance should track the performance of the rest of the modem. Providing various interoperable cost/performance options extends the breadth of feasible users (home, office, industrial and custom products) and reduces cost by increasing production qualitites. Examples include a low cost non-diverse IF limited receiver to which antenna diversity, equalizer and additional processing could be added, depending upon the price sensitivity of the user. Another example where the present invention can be applied is the transceiver shown in FIGS. 1A–1F.

Starting at the low end, the current antenna diversity metric, which optimizes signal to noise ratio (1 and 2 MBPS specification) with an IF limited signal, can be easily modified to optimize multipath performance for useful IF limited delay spreads. Accurate performance of the metric at very large delay spreads, far beyond the useful range of a limited receiver, is not necessary.

Optimizing performance at 1 and 11 MBps requires different metrics since their susceptibility to multipath effects are vastly different. As the data rate is not known at the antenna diversity decision time, redoing antenna diversity between the header and the start of 11 Mbps data requires no 1 or 2 Mbps specification changes while providing a very robust accurate hardware efficient metric optimized for the specific data rate. A very robust accurate hardware efficient metric can be used when the scheme uses the code word vectors (in one embodiment 8 Walsh basis vectors) received on each antenna and a correlation is performed to decide on the best correlation.

A high performance receiver which corrects for the multipath would necessarily want to minimize the processed symbol error rate. How this can be accomplished varies with the particular receive processing. Typical examples include RMS residual error from an equalizer and trace back information from a maximum likelihood algorithm.

A simple access point (AP) transmit antenna diversity scheme, which can be added to receive diversity, to provide significant improvement with no hardware impact, is also set forth below.

The IF limiting low end receiver requires good multipath diversity performance for 25 to 50 ns RMS delay spreads with minimal hardware. This low end receiver will lose significant throughput with larger delay spreads. However, the diversity scheme works with higher delay spreads to choose the low delay spread antenna, if one is available.

The diversity scheme is fully compliant with the current IEEE 802.11 specifications. The diversity selection process of the present invention is best suited for the IEEE 802.11 high rate waveform.

The diversity in one aspect of the present invention is done during the Barker preamble where it is currently accomplished. Since the data rate is unknown to the receiver at the diversity decision time, the performance will necessarily be a compromise. This can be accomplished as performance is acceptable at 100 ns RMS, which is beyond the useful operating RMS delay spread.

The diversity scheme can operate with an IF limiter and obtain excellent performance at all useful delay spreads. Optimizing performance at 1 and 11 MBps requires different metrics. Because the data rate is not known at the antenna diversity decision time, redoing antenna diversity between the header and the start of the 11 MBps data is reasonable. The goal is to minimize complexity and the additional gate count (1,000 gates).

The code word vector diversity of the present invention inserts a second antenna diversity period between the header, where the high rate is selected, and the start of the high rate data. As an example, the second antenna diversity period could be a Walsh basis vector. Because no changes are necessary to the current 802.11 specification, except the rate field, this permits a plurality of code word vectors to be received on each antenna. In one aspect of the invention as an example, the code word vectors could be eight Walsh basis vectors.

The receive limiter could reduce cost by deleting the AGC function. The diversity scheme could operate with differentially detected non-coherent bit sync samples. This information already exists and has been non-coherently combined to reduce its variance.

The present invention can minimize complexity and additional gate count. This has been accomplished as only approximately 500 additional gates are required for the multipath diversity metric.

An example of an IF limiter diversity bit sync metric is provided as follows:

$$\text{Metric} = -S_{-2chips} - S_{-1chip} + S_O - S_{+1chip} - S_{+2chips}$$

or with a small loss $$\text{Metric} = -S_{-1chip} + S_O - S_{+1chip} - S_{+2chips}$$

where $S_O$=bit sync peak sample.

The IF limiter diversity bit sync metric in accordance with the present invention is computed by subtracting a predetermined bit sync samples (such as an example four bit sync samples) a predetermined number of chips on either side of the bit sync peak from the peak (such as one and two bits). The antenna with the higher result becomes the selected antenna. Not subtracting the sample the predetermined number of chips early results in only a small performance loss.

The code word distance, a robust measure how close demodulated symbols are to making an error, can be computed by:

1. Finding the minimum correlation of the code word vectors transmitted sequentially on one channel (I or Q).
2. Finding the maximum of the absolute value of the cross-correlation of the code word vectors on both channels not including the correlation peaks above.
3. Subtracting the results obtained from #2 from the results obtained from #1 above. If Walsh vectors are used, then eight Walsh basis vectors are used.

Assuming the code word distance is an indication of message error rate, it can be used as a quick indication of antenna diversity accuracy.

Figure 2:
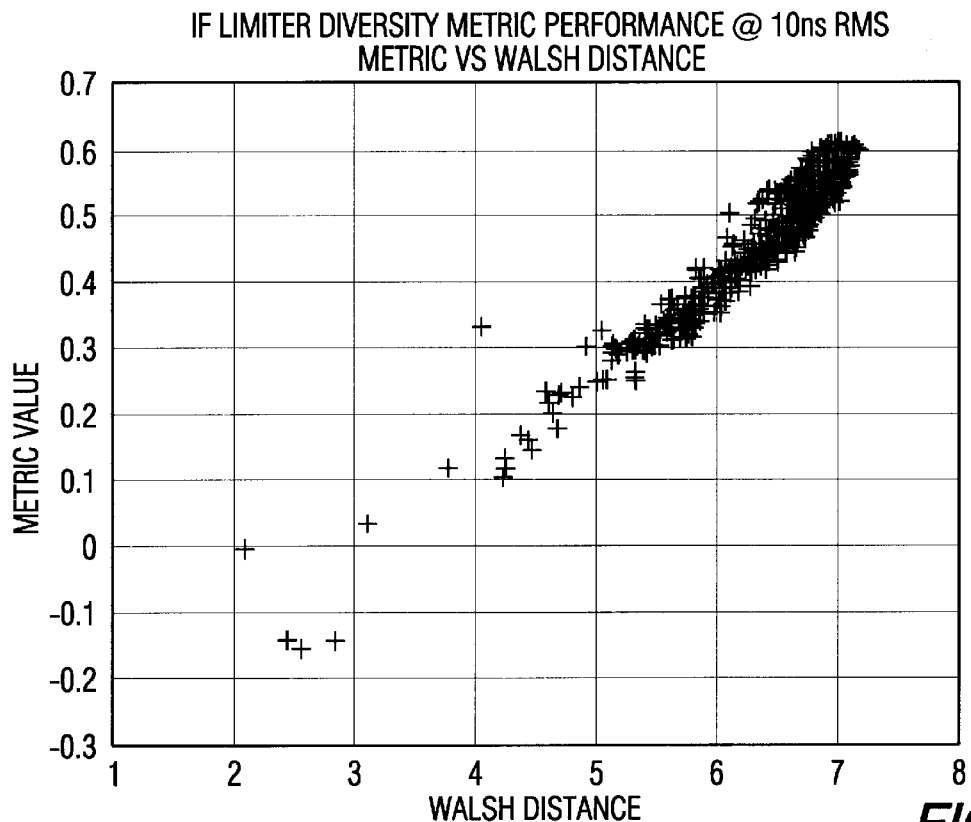
FIGS. 2–5 illustrate the correlation of non-coherent bit sync metric of the present invention with the Walsh distance shown for 10, 25, 50 and 100 ns RMS.
Figure 3:
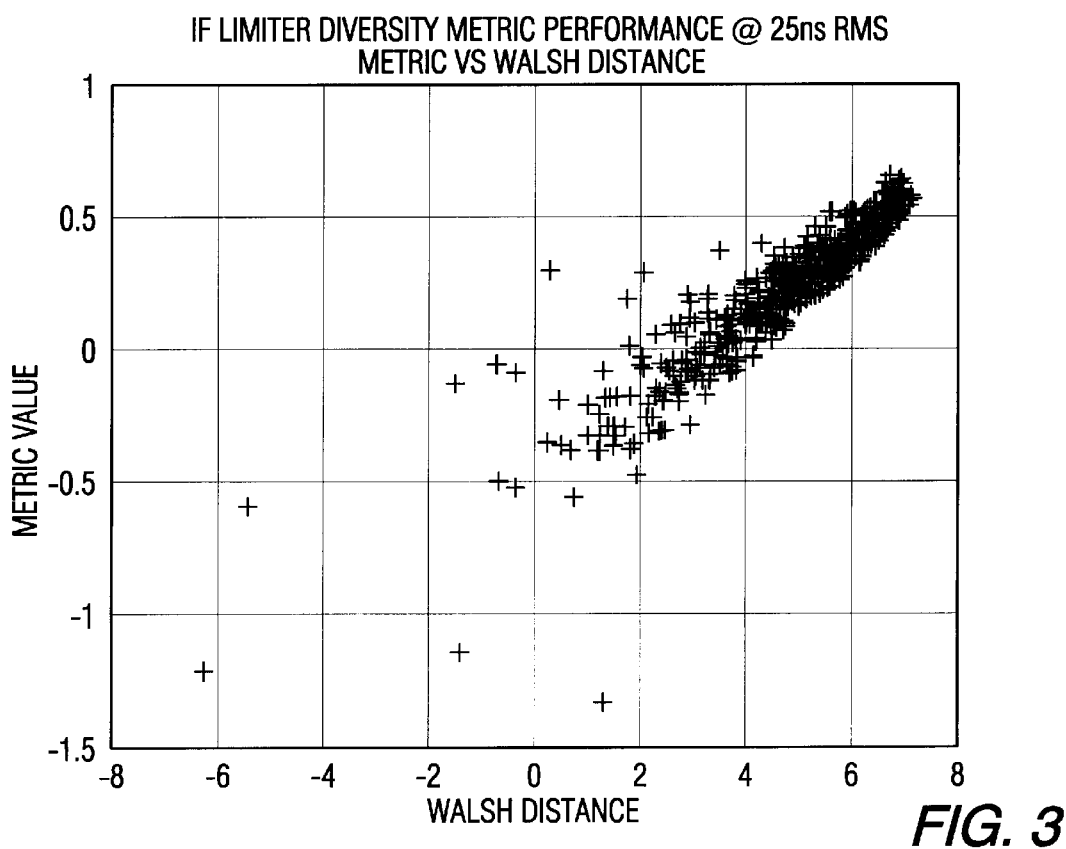
Figure 4:
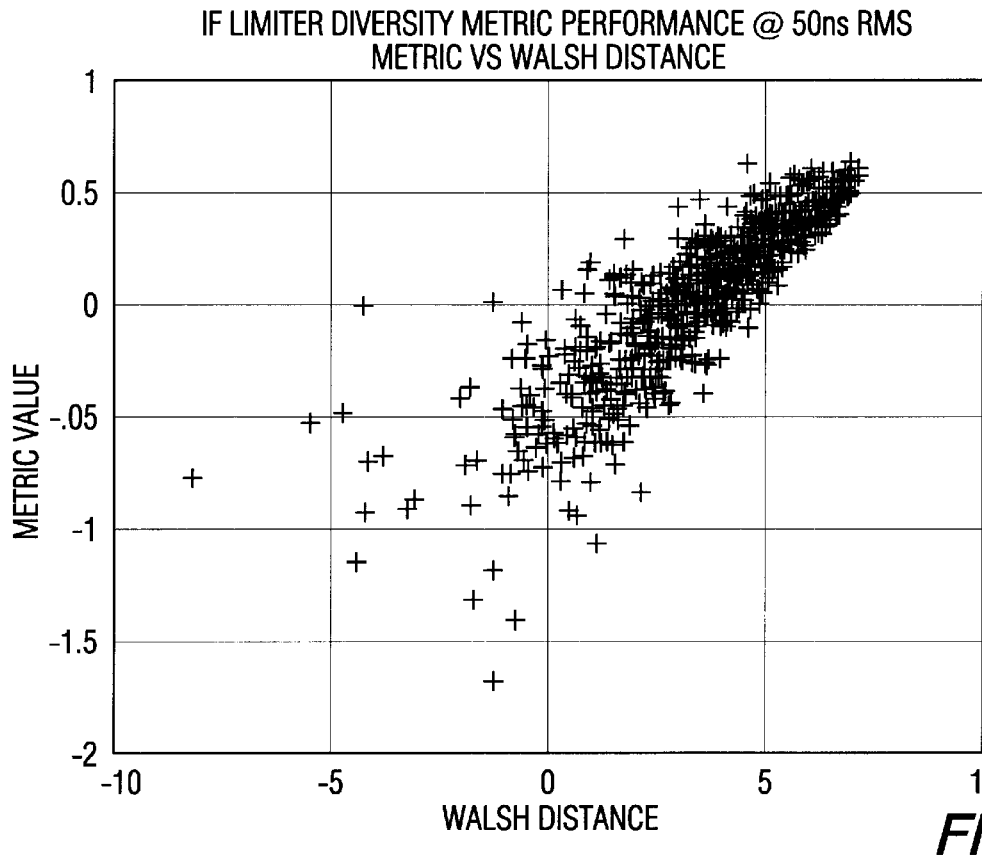
Figure 5:
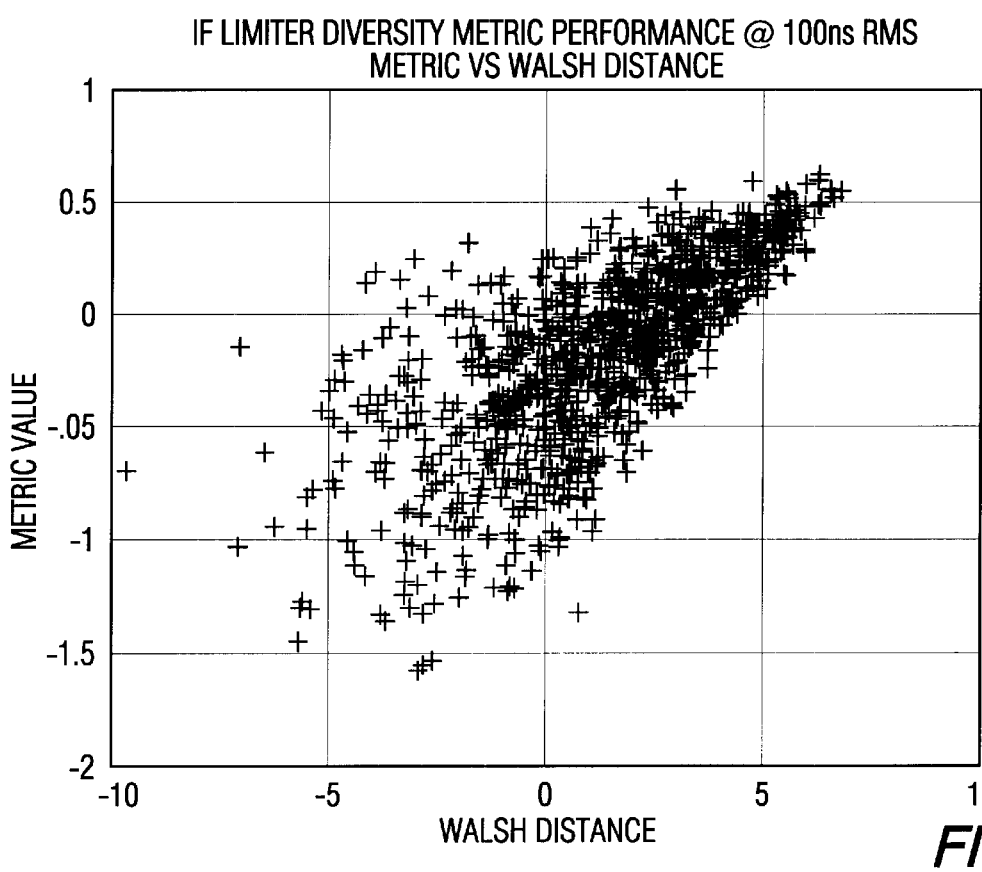

Relating to this IF limiter diversity metric performance as explained before, the correlation of this non-coherent bit sync metric with Walsh distance is shown for 10 (FIG. 2) 25 (FIG. 3), 50 (FIG. 4), and 100 (FIG. 5) ns RMS. Each figure consists of 1000 trials. For the delay spreads of interest and an IF limiting receiver, this metric appears highly correlated with symbol error rate.

Relating to the code word vector diversity assumptions, higher performance receivers require an antenna diversity metric with improved performance at delay spreads greater than 100 ns. This metric can be used by both higher performance IF limiting and linear receivers. It can operate with an IF limited receiver with excellent performance at all delay spreads.

Optimizing performance at 1 and 11 MBps requires different metrics. Because the data rate is not known at the antenna diversity decision time, redoing antenna diversity between the header and start of the 11 MBps data is a preferred approach. Again, the goal is to minimize complexity and additional gate count.

The code word vector diversity concept inserts a second antenna diversity period between the header, where the high rate is selected, and the start of high rate data. No changes to current IEEE 802.11 specification (except rate field) is required as the format of the high rate data field has not been specified, and the reception of an unspecified data rate is handled per the current specification.

The concept is to transmit the code word vectors twice (if Walsh vectors are used, eight Walsh vectors), which permits the code word vectors to be received on each antenna. By this approach, a compromise can be achieved between complexity and performance. Since the code word vectors are actually passed through the channel, de-convolution is not required for an accurate performance estimate.

The code word distance is hardware efficient as the correlators already exist for data demodulation. Implementing the minimum and maximum processing requires approximately 1000 gates.

Figure 6A:
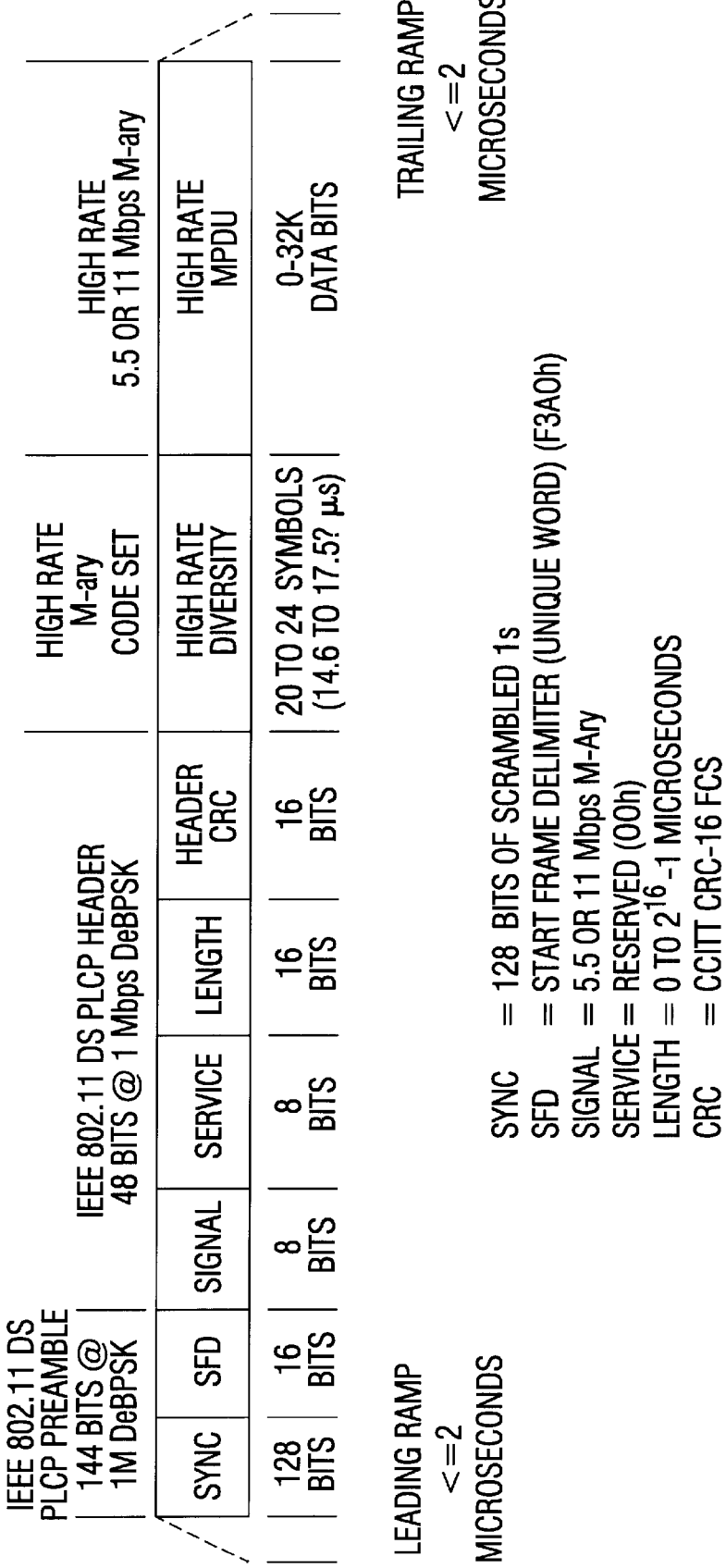
FIG. 6A illustrates a code set diversity high rate frame format that includes a code set high rate portion within the message so that the decision is improved by not being based purely on the Barker portion of a waveform.

The suggested high rate frame format, as shown in FIG. 6A, includes a new field for redoing the receive antenna diversity. This variation includes a high rate portion within the message so the decision is improved by not being based purely on the Barker portion of the waveform. At this point, the following data rate is known. The antenna diversity can therefor be optimized for the rate. The MAC does not need to take this field into account when computing the length of the field. By using an unused bit in the header, the BBP could decode whether or not this field is included, thus permitting short 11 MBps messages to selectively delete this approximately 15 microsecond field.

Figure 6B:
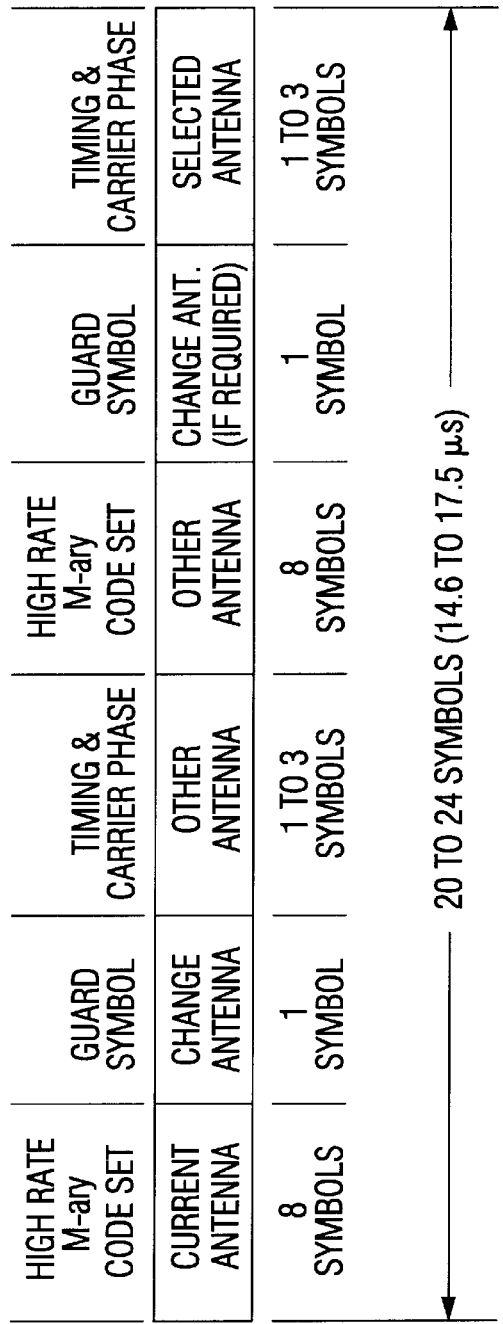
FIG. 6B illustrates another code set high rate field format where the implementation scheme assumes that the decision is purely made on the Barker code without any feedback from the Walsh/CCK part of the message.

A high rate field format, as shown in FIG. 6B, includes six new sub-fields required for redoing the receive antenna diversity. This implementation scheme assumes that you make your decision purely on the Barker code without any feedback from the Walsh/CCK part of the message. These sub-fields include:

1. Code word distance (could be Walsh distance) for the current antenna which was selected for optimum 1 MBps operation.
2. Guard time for antenna switching and filter decay time.
3. Timing and carrier phase acquisition for the other antenna. Since the signal to noise ratio must be relatively high for 11 MBps operation, compared to 1 MBps operation, 1 to 38 chip symbols should be sufficient.
4. Code word distance (could be Walsh distance) for the other antenna using the same 8 symbol sequence.

5. Guard time for antenna switching and filter decay time. The receiver does not need this unless the original antenna was selected, but must be included.
6. Timing and carrier phase acquisition for the selected antenna. This could be shortened, but is included to be conservative.

Relating to the AP protocol transmit diversity assumptions, transmit antenna diversity can provide significant throughput improvement at little cost beyond receive diversity. A simplified access point (AP) transmit antenna diversity scheme permits a low cost improvement in throughput.

The scheme is integrated with IEEE 802.11 protocol. The network is "hub-spoke" having an AP and one or more stations. All traffic passes through an AP. The AP has dual antenna diversity, stations do not (in an important scenario). The scheme works for diverse and non-diverse AP's without prior knowledge by the stations. A node knows if it is an AP. An AP knows if it has dual diversity or not. The channel is stationary for several messages (the multipath spec assumes this). Assume single and multiple isolated messages with acknowledgments (ACK). The probability of 1 MBps header loss is relatively low. The AP Media Access Controller (MAC) can store and process 1 bit per station for the selected antenna. One unused header bit can be used as an ACK/NAK bit. Retries occur as soon as possible. A reciprocal channel is not necessary, but may be used. NAKs are only used to prevent other stations from transmitting via CCA.

Relating to the AP protocol transmit diversity, the following description explains in time a basic sequence.

1. AP has information to transmit to a Rx Station. The Rx Station's previously selected Tx antenna is used.
2. If an ACK is received, the Tx antenna will be used first for the next Tx to that Station. The robust ACK bit in the header makes this work. The Tx antenna may be modified by a later reception from the Rx Station.
3. If an ACK is not received, the message is quickly retransmitted on the other antenna.
4. See #2.
5. If an ACK is not received, neither Tx antenna worked. This appears to the system as a missing message. The Rx Station's selected antenna remains unchanged as it was best in the past.
6. A Station has information to transmit to the AP. The AP's current HW diversity is used to select the Rx antenna.
7. If the data is verified, the Rx antenna will be used for the ACK and the next Tx to that Station. The robust ACK bit in the header makes this work. The Tx antenna may be modified by a later reception from the Rx Station.
8. If the data is not verified, a NAK is sent on the Rx antenna and the message will be quickly retransmitted for reception on the other antenna. The Rx antenna is used for the NAK as the other may have no communication. The NAK prevents other Stations from transmitting.
9. See #7.
10. If the data is not verified, neither Rx antenna worked. This appears to the system as a missed message. A NAK may be retransmitted to reduce number of control states.

The following description shows another sequential process.

1. The station has information to transmit to an AP.
2. If an ACK is received, the message was received. The robust ACK bit in the header makes this work.
3. If an ACK is not received, the message is quickly retransmitted.
4. See #2.
5. If an ACK is not received, neither AP Rx antenna worked. This appears to the system as a missed message.
6. AP has information to transmit to a station.
7. If the data is verified, an ACK is transmitted to the AP. The robust ACK bit in the header makes this work.
8. If the data is not verified, a NAK is sent and the message will be quickly retransmitted. The NAK prevents other stations from transmitting.
9. See #7.
10. If the data is not verified, neither AP Tx antenna worked. This appears to the system as a missed message. A NAK may be retransmitted to reduce number of control states.

This scheme helps the AP to station messages by adding AP Tx antenna diversity, it does little for station to AP throughput unless short probe messages are used. Improvements can be made based on various realistic assumptions: e.g., having the stations tell the AP which Rx antenna to use based on their receptions and a reciprocal channel assumption. This would require a change in the preamble or a change in the inter-message gap timing.

FIG. 6C illustrates a circuit portion of the high data rate demodulator 60 of FIG. 1A that determines the bit sync peak sample within the packet symbol and subtracts a predetermined number of bit sync samples a predetermined number of chips on either side of the bit sync peak sample. As shown in FIG. 6C, the I and Q channel inputs pass into the three bit analog to digital converters 41 and then into time in variant matched filter correlators 94*a*, 94*b*. The correlated signals then pass into a magnitude determination circuit 94*c* and into accumulator 94*d* that accumulates symbols. This process occurs in real time and a clocked waveform will come out in real time. The subtractor includes appropriate subtractor elements 94*e* from the earliest to the peak to the latest and appropriate addition and subtraction elements 94*f*, 94*g* as is well known to those skilled in the art. These elements can be part of the DPSK demodulator and descrambler.

Multipath Mitigation

The present invention is also directed to high-performing, low-complexity techniques for mitigating multipath at the high data rates of 5.5 and 11 MBps. The following explanation of the invention centers on 11 MBps. However, the modifications required to down-scale to 5.5 MBps are straight-forward.

Multipath as described above is a recurring problem in spread spectrum communications, especially with the use of WLAN systems. Another decision metric can be used to mitigate multipath using the channel impulse response. Thus, once an antenna is chosen, such as in the decision metric described above, the signal can still be "cleaned up." In accordance with the present invention, an equalization stage is used, such as with the base band processor of the type as described above.

One problem in an aspect of the technology is that there are two portions of one type of waveform: (1) the preamble portion, and (2) the longer data portion. The preamble portion includes part of the 11 chip codes that form the Barker codes, while the other portion could form the Walsh codes that are the eight chip codes forming the orthogonal code sequence. The architecture that will be described can be used within any coded portion to minimize multipath problems. However, the method and architecture of the present invention is described in detail with a Walsh code correlator for purposes of illustration. The invention is not limited to a Walsh code correlator.

As noted above, the preamble can be used to synchronize and do antenna selection. When the processor finally obtains the data portion and begins processing as noted above with the base band processor shown in FIGS. 1A–1F, the waveform can be demodulated by the carrier tracking loop (also known as carrier loop circuit) using the NCO and C/S ROM as noted above. For each chip that comes into the spread spectrum waveform, there is also a decision on that chip and a carrier recovery loop is run as noted above with reference to FIGS. 1A–1F, which illustrate an example of a base band processor that could be modified for use of the present invention.

As noted above, the transmitter sends one code word at a time and the receiver must correlate to determine the largest correlation as noted above. A problem with multipath distortion is that the chips coming into the correlator are distorted by the multipath (the echoes) coming into the receiver. The present invention is advantageous because it uses equalization to equalize out the multipath distortion. The particular type of equalizer of the present invention is a decision feedback equalizer using FIR filters. The channel impulse response can be estimated and once the multipath is determined, the system analytically computes what the taps would be. The taps can be initialized.

In one aspect of the present invention, a full equalizer is not used, but the feedback structure of the impulse response filter is only used. This feedback structure requires only adds and subtracts and decisions come in as ±1. The chip decision circuit is operative with carrier recovery and when a chip decision is made, the chip decision that is used for the basic broad band processor is also used for the equalizer made with the carrier recovery. The finite impulse response filter is primarily known to those skilled in the art as a shift register with weighted taps. The FIR creates a local copy and resynthesizes the echo and subtracts it out and acts as an echo cancelor. Thus, the tail portion shown in FIG. 31 has been canceled. The feedback taps can be varied to change what is to be canceled.

In still another aspect of the present invention, a feed forward stage that requires a full multiplier can be added. It is not added within the loop, but filters out the head.

The signal processing techniques provide theoretical performance of less than 10% packet-error-rates at multipath spreads up to 200 nsec RMS. The invention is unique in exploiting a certain characteristic of the multipath channel other approaches ignore—statistically, the predominate channel-impulse-response energy follows the impulse response peak. Also, the present invention avoids the data-rate capacity loss which naturally occurs when the signal is burdened with other constraining waveform properties.

These strategies are shown to be advantageous when trying to achieve a high bits/Hz spectral efficiency at low complexity. The present invention works with the existing preamble or with a new short preamble. Only an accurate channel impulse response estimate is needed to configure the demodulator for data-mode tracking.

As background, the amount and types of linear distortion which the receiver must cope with are presented. For good performance the distortion must be compensated. The compensation techniques can greatly increase complexity. The key system components including the linear distortions is illustrated in FIG. 7, showing transmitter filters 100, multipath fading 102 and receiver 104.

FIG. 8 shows the modulator/demodulator filters which can be used in the present invention. The transmit filters 105 must meet a spectral mask and include a TX SAW filter 106. Limiting bandwidth consumption is important for multiuser occupancy. The receive filters 107 limit noise, interference and control frequency translation distortion and include an RX SAW filter 108. Cost effective filters have been selected. Models of these filters have been used in performance analysis.

Figures 9A, 9B:
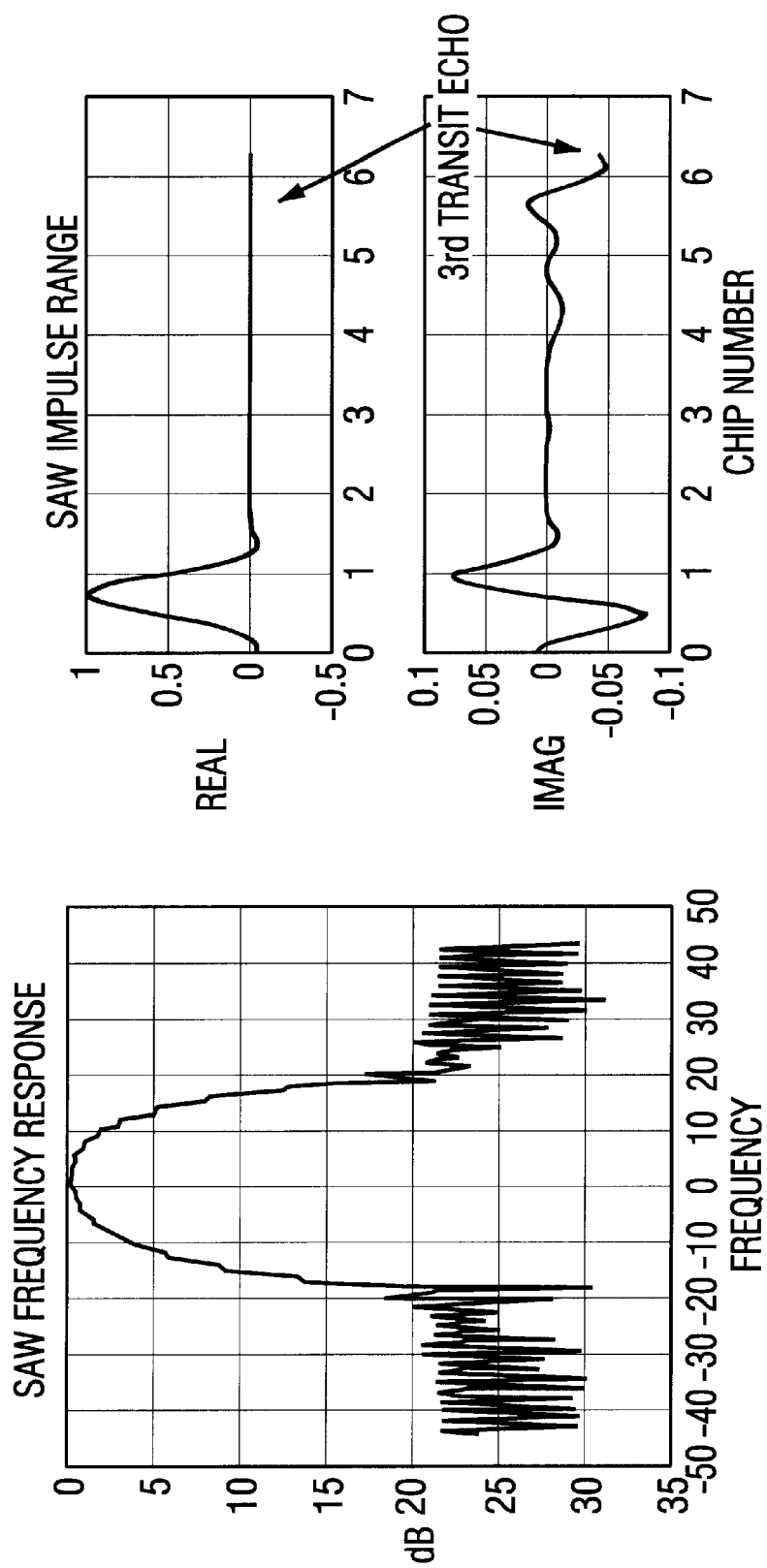
FIGS. 9A and 9B show the respective frequency response and impulse response for real SAW filter characteristics and/showing/a third transit echo.

FIGS. 9A and 9B shows the lab-measured characteristics of the SAW filters. FIG. 9A shows the frequency response and FIG. 9B shows the impulse response. The presence of the third transit echo, a characteristic of SAW filters, is illustrated.

Figure 10B:
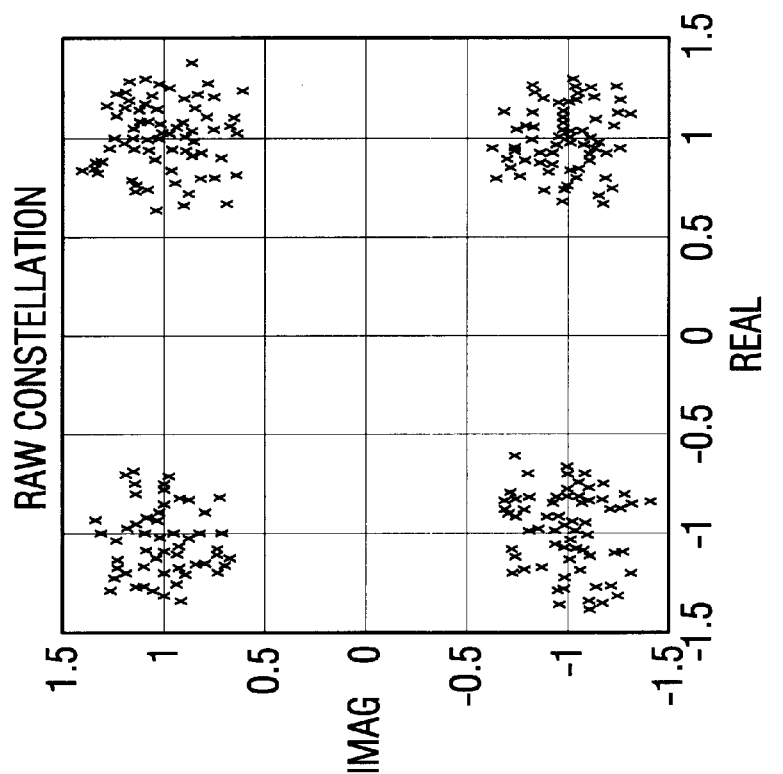
FIGS. 10A and 10B show end-to-end mode and filter responses.
Figure 10A:
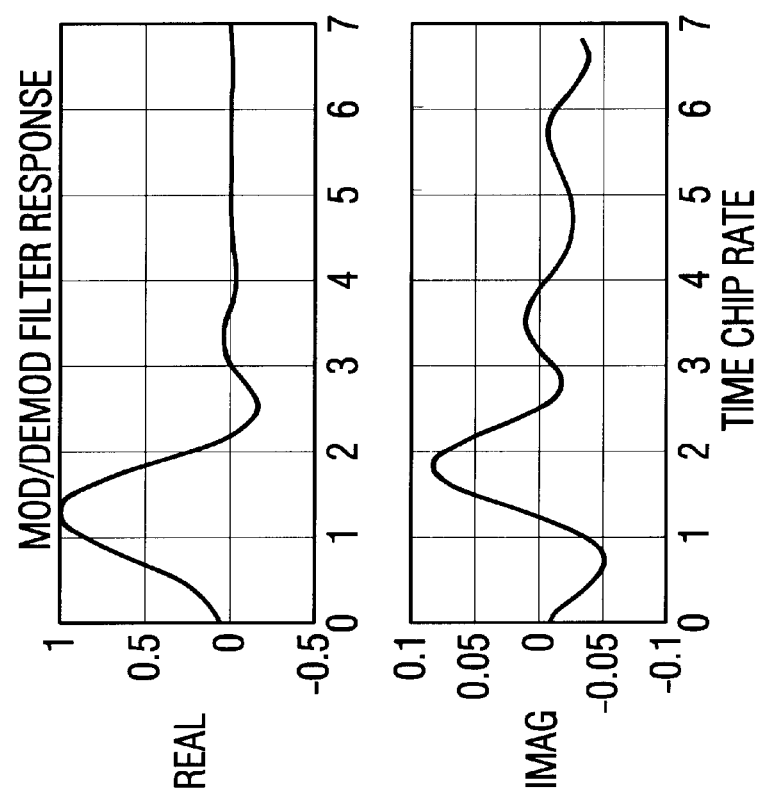

The resulting modulator/demodulator impulse is shown in FIG. 10 for the end-to-end modem filter response. The filters cause multiple-chip-duration distortion. This distortion is included for realistic analysis. The modem filter's impulse response is convolved with the multipath channel figures. This causes a significant smearing of the channel fingers.

The filters cause a non-trivial amount of eye closure in the scatter plot. Techniques which combat multipath help mitigate the distortion caused by the modem filters.

Figure 11:
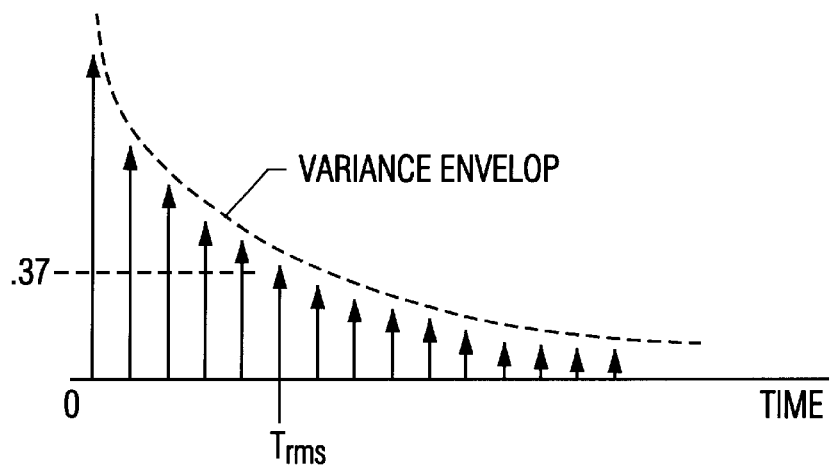
FIG. 11 is a graph showing the discrete exponentially-decaying Raleigh fading channel model.

The exponentially-decaying Raleigh fading multipath model used to estimate performance is now discussed. FIG. 11 shows the characteristic of a discrete exponentially decaying Raleigh fading channel model. The stochastic realization consists of complex Gaussian RV's at each discrete instance. This model uses many multipath components. They are finely spaced. The invention retained all energy until the tails contained only energy more than 30 dB down.

Figures 12A, 12B:
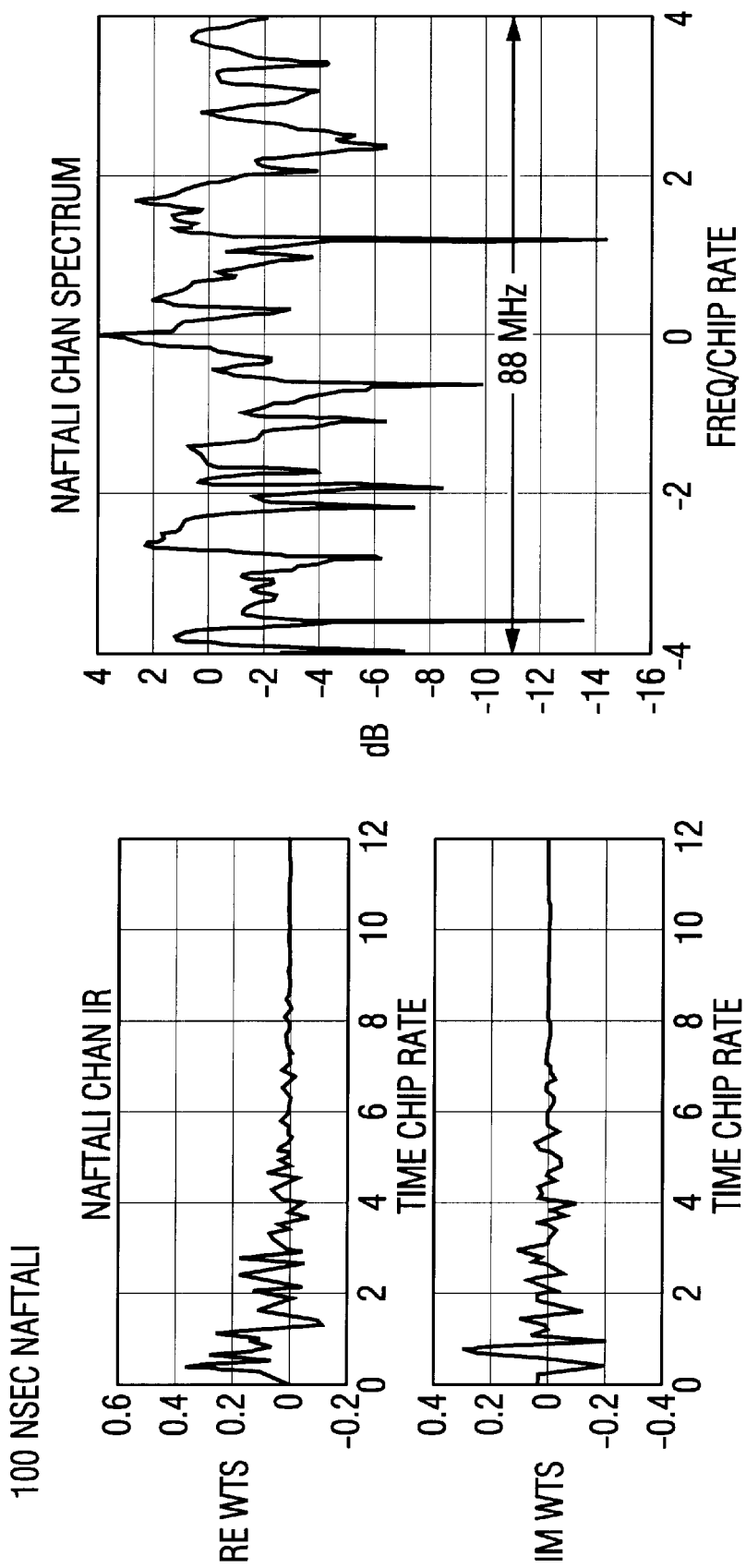
FIGS. 12A and 12B show the exponential fading example for a stochastic realization for a 100 nsec RMS delay-spread case.

A stochastic realization for 100 nsec RMS multipath is shown in FIG. 12, which illustrates exponential decaying fading examples. The invention used 8 samples per chip. The chip rate is 11 MHZ. The impulse response typically spans 6 to 8 chips for the 100 nsec RMS spread channel. The coherent bandwidth is about 0.5 MHZ.

End-to-end effects are now discussed, which examines the linear filtering effects extending end-to-end. FIG. 13 shows a stochastic realization for the 100 nsec RMS multipath spread case. The signal has been decimated to 1 sample/chip about the impulse response peak. The 100 nsec RMS delay channel typically spreads energy across 6–8 chips.

Figure 13A:
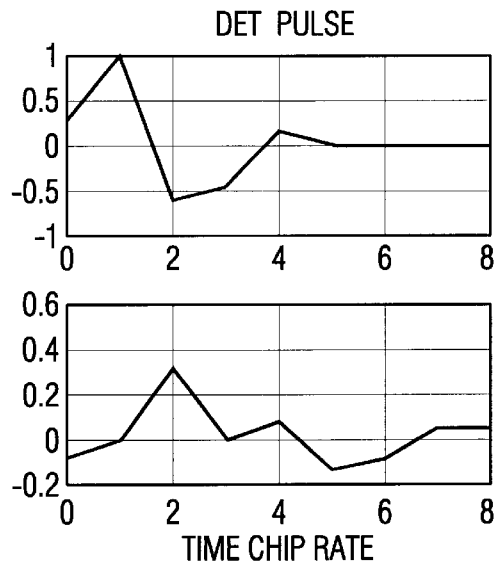
FIGS. 13A, 13B and 13C show the respective impulse response, frequency response and Nyquist bandwidth and the corresponding constellation for a modem/channel cascade example for a stochastic realization for the 100 nsec RMS delay spread.
Figure 13B:
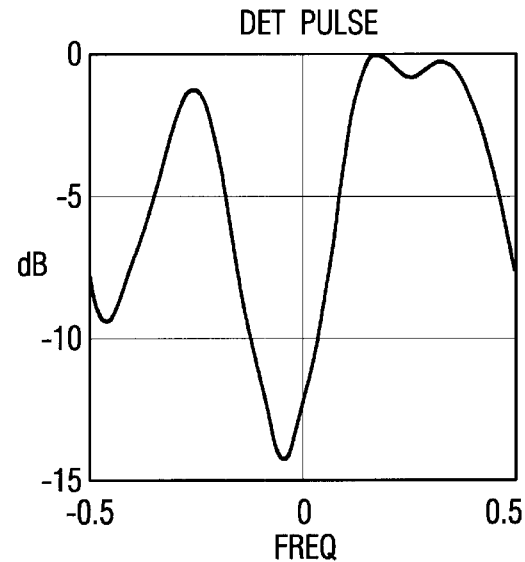
Figure 13C:
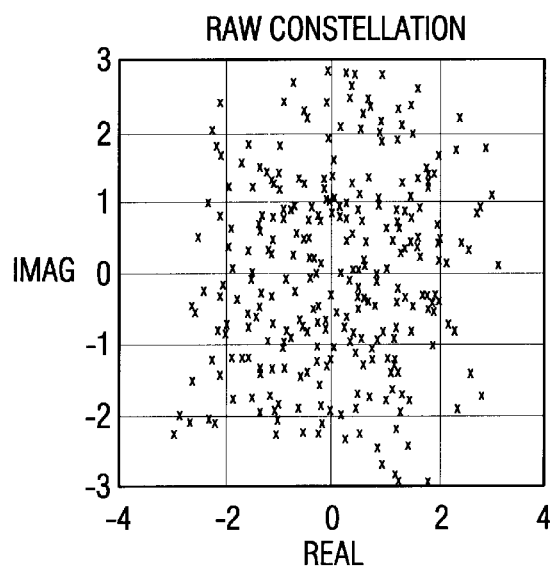

FIG. 13A shows the impulse response. FIG. 13B shows the frequency response in the Nyquist bandwidth. FIG. 13C shows the corresponding constellation.

Figures 14A, 14B:
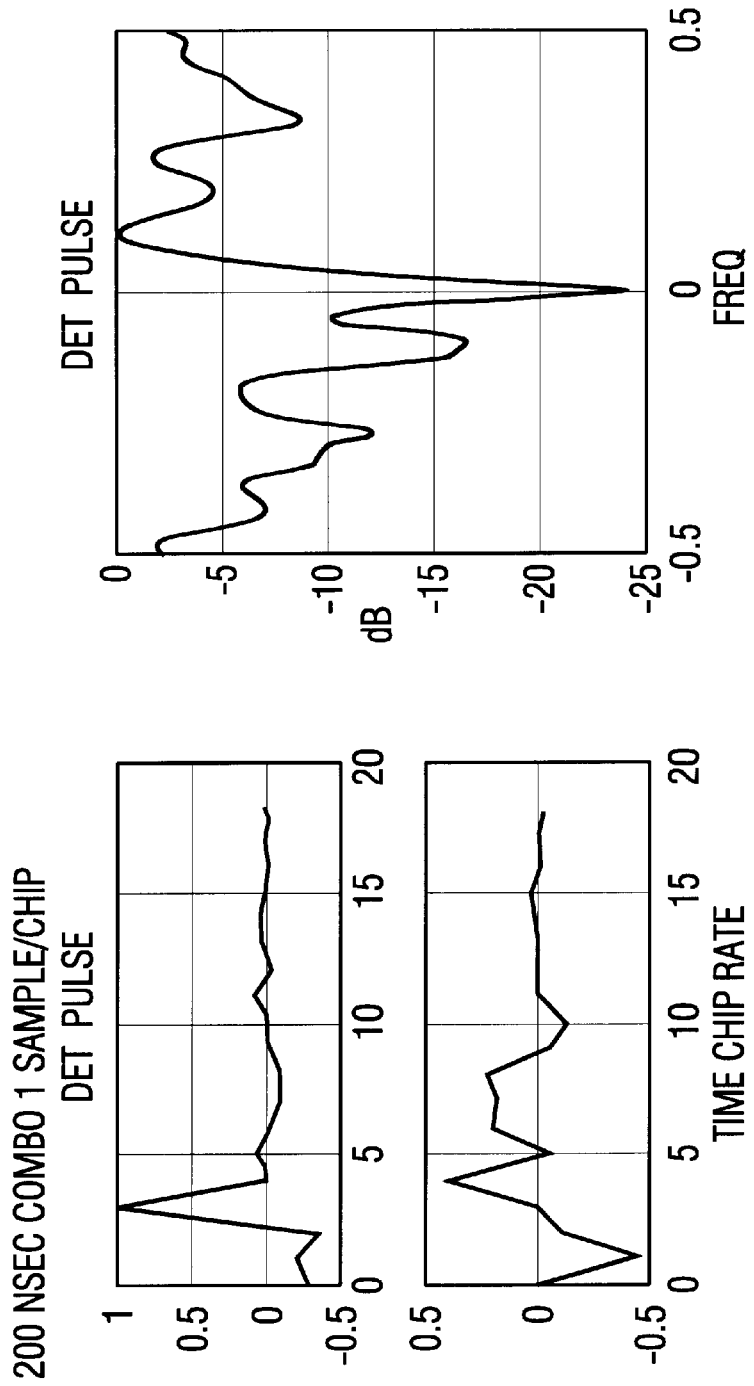
FIGS. 14A and 14B show the respective impulse response and frequency response for a stochastic realization with a 200 nsec RMS delay spread.

FIG. 14 shows a stochastic realization for the 200 nsec RMS multipath spread case. FIG. 14A shows the impulse response and FIG. 14B shows the frequency response in the Nyquist bandwidth. Here the energy is typically spread across 12–16 chips. The Barker word is limited in its ability to estimate channel impulse response this long.

Figure 15:
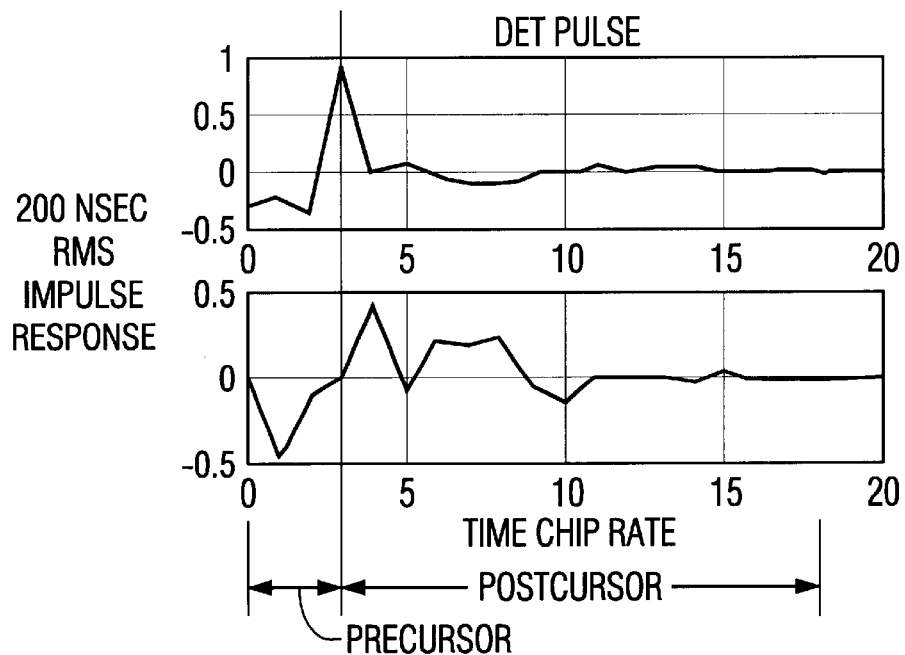
FIG. 15 illustrates a graph of a post cursor component.

FIG. 15 illustrates the post cursor component as the dominant channel characteristic. The end-to-end energy spans about six times the RMS delay spread. The receiver complexity is driven by this effect. Typically the channel has a small amount of precursor energy leading the impulse response peak and a lot of post-cursor energy following the peak.

Thermal noise is another important issue. Thermal noise is predominately generated in the receiver front-end and is measured by the noise figure. Propagation loss defines where the signal lies relative to the noise floor. Some environments are $1/r^e$ while others are $1/r^4$, where r is the TX/RX separation.

Figure 16:
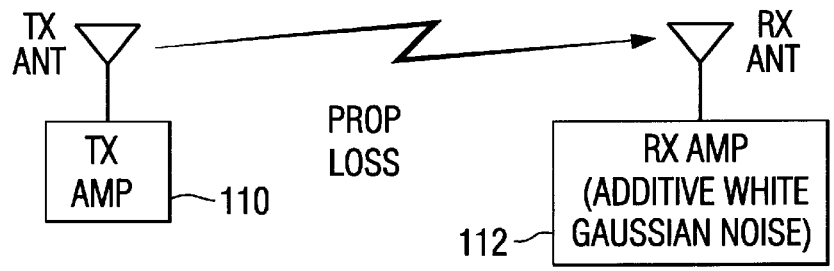
FIG. 16 illustrates how the signal power in a spread spectrum receiver is influenced by the communication link.
Figure 17:
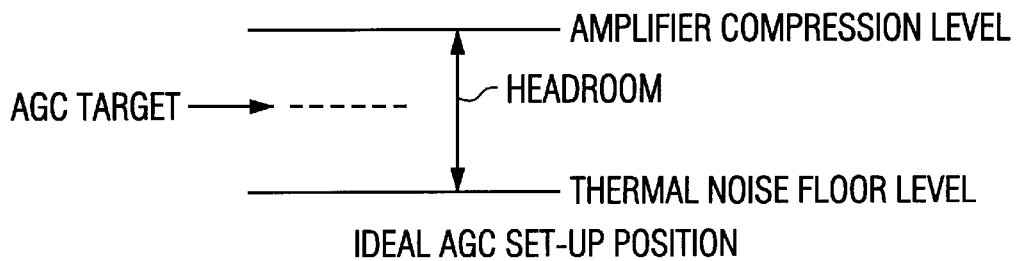
FIG. 17 illustrates an ideal AGC set-up position.

For linear processing, AGC set-up is an important issue as shown in FIG. 16, where the signal power in the receiver is influenced by the communications link.

An important issue is evaluating to what degree noise is important versus multipath effects. Some designs may be more noise robust but less multipath robust. Other designs may be more multipath robust but less noise robust. An issue arises concerning the importance of weighting for performance in real-world situations.

In accordance with the present invention, a signal design is set forth to select a waveform for high data rate WLAN transmission. No clear cut picture exists for selecting a waveform. Engineering intuition of those skilled in the art makes the ultimate selection, possibility based upon cost and extensibility issues. However, it is believed that the narrowband-equalized signaling has not been previously analyzed sufficiently to uncover strong merits in its favor.

The two traditional communication paradigms that dominate high rate 802.11 signaling viewpoints have been the bandwidth-limited and the power-limited scenarios. This is illustrated in FIG. 18. Additional factors include multipath and multi-user capacity. Using the capacity equations for signaling in additive white Gaussian Noise (AWGN), general conclusions can be drawn. Unfortunately, the present situation is complicated by other factors. Multipath is a major performance limiting impairment along with the AWGN. Also, it is desirable to have a high multi-user capacity within the bands of interest (2.4 GHz and 5 GHZ), since these are shared spectral resources. These additional factors lead to an erosion of the normal "rules of thumb" known to those skilled in the art.

Nevertheless, the democratic majority seeks to push higher data rates through the medium. A single-user does not care how the data rate increased, just as long as the performance is good. For a single, isolated TX/RX modem pair, high data rates with good symbol error rate performance can be obtained by either conserving power or conserving bandwidth. This is depicted in FIG. 19, showing digital modulations capacity compressions at $10^{-5}$ symbol error rate. The signals (QPSK, 8 QPSK, 16 QAM) which maintain bandwidth must be provided increasing Eb/No to successfully communicate. The signals which conserve TX power by operating at low Eb/No's must necessarily consume bandwidth. The waveforms proposed to the 802.11 committee fall within these regions. RAKE based techniques tend to fall in the BW consuming camp, while the equalized-based techniques tend to fall within the power consuming camp. By looking at the BITS/HZ axis, it is apparent that the equalizer based communications conserve BW at the single user level.

A system designer looks at these issues because the designer is interested in the joint performance of all users. Most communications today occur in scarce spectral resources allocated by governments, such as the FCC in the U.S. Multiple users must be able to operate well concurrently. Consequently, the system designer is interested in the joint capacity of the spectral band. Here, the BITS/HZ metric includes all users.

To optimize band capacity, there are two lines of attack. On approach is to conserve bandwidth at the single user level, so many single users can be packed concurrently within a band in a non-interfering fashion. A second approach is to consume bandwidth allowing users to interfere frequently, and use processing gain to reject and combat the high signal-to-interference (SIR) ratio. For a second interfering system to work well, adaptive power control has been shown to be crucial. These two viewpoints are played-out in the cellular/PCS worlds as shown in FIG. 20, showing standard 114, bandwidth 116, and processing columns 118 with TDMA and CDMA standards.

The narrowband band-capacity-optimization approach is preferred primarily because it is more difficult to maximize band-capacity by coordinating users in the wideband approach. With the wideband approach, the users spread whether or not it is needed. The CDMA springing in the 802.11 bands is too low to provide adequate processing gain. Adaptive power control needed to realize multiple access is difficult. The WLAN systems tend to be more uncoordinated than the Cellular/PCS systems for reasons that are apparent to the those skilled in the art.

The narrowband Cellular/PCS systems tend to use equalizers, while the wideband systems use the RAKE. The present invention uses an equalizer to combat multipath distortion while conserving bandwidth.

The section on capacity loss through waveform features overhead describes that certain proposed waveforms carry bandwidth consuming, data-rate limiting features which tend to limit capacity performance. The invention proposes a waveform that is not bound by these constraints, maximizing single-user and multi-user capacity.

Many proposals before the IEEE committee describe waveforms which contain certain features beyond simple information bit loading. The first waveform feature described limits intersymbol interference. This is evident in the both OFDM and RAKE (correlation based processing). In both these systems, conventionally signaling symbols must be much longer in duration than the multipath spread. The motive for this is shown in FIG. 21, which illustrates the minimizing ISI by increasing symbol duration so that the convolution smear is a small percentage of the symbol.

The channel multipath spread smears adjacent symbols into one another. This intersymbol interference (ISI) can be significant, requiring equalization to mitigate the performance loss. OFDM systems use a slow IFFT/FFT signaling rate within waveform cyclic extensions (buffering) to minimize the effect. RAKE receivers traditionally have a many chips/symbol, with long duration symbols for the same reason.

Unfortunately, the multipath spread is very long compared to practical RAKE symbol durations. Hence, under non-trivial multipath spreads, the 802.11 proposed RAKE techniques suffer significant loss from ISI. This is true even if the RAKE symbols have fairly good correlation properties.

The second waveform feature frequently sought involves good correlation properties. RAKE receivers have the best performance if the symbols are designed to have impulse autocorrelation properties and near-zero cross correlation properties. The motive involves symbol detection through RAKE combining. The RAKE combiner does not work well unless the preceding correlation stage generates correlation outputs which equal the channel impulse response, independent of the specific transmission symbol. If this feature is not true, symbol distance erosion occurs.

The drawback is the design of symbols with good correlation properties consumes bandwidth as shown in FIG. 22.

A much broader bandwidth is necessary. This is not a problem if the waveform already consumes much bandwidth for either CDMA or diversity enhancement through bandwidth (BW) spread beyond the coherent BW. This again is compatible with the power-limited modulation design concept.

Consuming bandwidth to purchase correlation properties means the bandwidth cannot be spent sending information bits. This limits the capacity of the single user, thereby limiting multi-user capacity within a band.

Another situation arises which greatly weakens the use of signals with good autocorrelation properties. This occurs when higher data rates are attempted with a base waveform. The key example here is with Lucent Technology's PPM modulation using the 11-bit Barker word. The 11-bit Barker word works well at low data rates because its autocorrelation properties are maintained. However, by attempting to load many information bits upon the 11-bit Barker word, overall good properties are lost. When many bits are loaded, on the kernel pulse, distance is rapidly lost between symbols. In addition, the distortion of multipath becomes problematic. The convenience of an impulsive autocorrelation kernel is largely lost. The complex channel impulse response smears together the potential Tx symbols. The quadrature signaling crosstalks into one another by the imaginary channel taps, and the in-channel symbols are also distorted.

A large set of maximum likelihood correlations must be jointly examined for optimal processing. Candidate in-phase and quadrature symbols must be jointly searched, forming a 64 symbol set. This complexity is so high, sub-optimal short-cuts must be made. Also, ISI is high, even exaggerated by PPM, so it must be fought with the MLSE Viterbi equalizer.

After the development of the 1 and 2 MBps standard, 802.11 has been faced with upgrading to higher data rates up to 10 and 11 MBps. If history follows its usual pattern, once a 10 MBps standard exists, motivation for a new standard will rise for 20 MBps or 30 MBps. Most of the proposals presented are fundamentally limited in data. However, the present invention allows a waveform which is extensible to 20 or 30 MBps, similar to the manner microwave links and voiceband modems have pushed higher data rates while maintaining a fixed bandwidth. The present invention provides greatly enhanced user acceptance and proliferation, since infrastructure does not need to radically change for the higher rates.

The present invention uses chip-level equalization, which use is motivated as shown by the summary of the motivations of FIG. 23. Many of the problems highlighted above for other waveforms is avoided. As will be shown in the following sections, this allows low-complexity, high-performance architectures. In addition, if SNR is good enough, chip-level equalization is potent (TDMA standards, microwave links). Bandwidth is not wasted trying to achieve good correlation properties. ISI is eliminated so that symbol duration is freed from multipath-spread considerations, and processing can be simpler.

One issue is, "Is the chip level SNR sufficiently high to allow chip-level processing, or is the processing gain of the many-chip symbol needed to realize adequate performance?" To answer this question, reference is made to FIG. 24. This figure shows the symbol-error-rate (SER) performance of the 8-chip on the I-channel and the 8-chip Walsh on the Q-channel versus the QPSK chip error rate. There is less than 2 dB SNR performance difference at $10^{-5}$. This results from attempting to pack a high number of information bits on a few chips. This data packing results from trying to force many data bits through a limited bandwidth. As shown earlier in the power-limited and bandwidth-limited capacity curves, achieving high bits/Hz forces higher Eb/No's to be used.

Similar analysis could be shown for a Lucent Technology PPM waveform. With this type of example, the many bits are packed on the 11-bit Barker word. So much distance is lost that performance would be nearly as good if the QPSK chips were converted to QPSK symbols and the information bits sent directly on the QPSK.

Equalization of the present invention does not mean that M-ary orthogonal waveforms cannot be used. M-ary orthogonal waveforms can still be used to provide orthogonal processing gain in thermal noise. Alternatively, PPM waveforms could be used with chip level equalization also. Eliminating chip level ISI means the RCV processing architecture becomes much easier.

Because a variety of equalizer techniques exist, it was essential to consider which type of equalizer technique to use. FIG. 25 shows a performance ranking of the most common techniques. The matched filter bound is not an equalization technique, but rather a benchmark against which all can be compared. The present invention can use both MLSE and DFE (Decision Feedback Equalizer) equalizer to satisfy the needs of the receiver.

Training the equalizer is not a significant hurdle for 802.11 in accordance with the present invention. DFE and MLSE training is not a big hurdle for Cellular/PCS TDMA systems in the same way.

The present invention provides an efficient and simple tracking architecture for high bits/Hz efficiency. The invention exploits a channel characteristic the prior art approaches have ignored. The channel is predominately minimum phase. In accordance with the present invention, the minimum phase distortion can be eliminated with adds and subtracts using the feedback taps in a decision feedback equalizer.

The invention provides high-resolution architecture scalability. The design implementation can be highly tailored to meet performance or power-draw needs. A designer is not forced to use one specific architecture for all scenarios. A suite of designs could be potentially made, optimizing particular features, all with the same waveform. The lowest complexity is provided in benign environments. Medium complexity is provided in moderate multipath environments. The highest complexity is reserved for the severe multipath environments.

The waveform of the present invention is unfettered by RAKE waveform constraints. The waveform's distance properties are equivalent to other systems, which are pushing the same bits/Hz spectral efficiency. The signal is applicable to both 2.4 GHz and 5 GHz. Short preambles can be accommodated, since equalizer acquisition only requires an estimate of the channel impulse response. Easy extensions provide data rates up to 20 or 30 MBps.

In accordance with several aspects of the present invention, three different architectures are presented. Naturally, the invention is not limited to such architectures. Other examples will come to the mind of those skilled in the art. These architectures work with the same transmit modulation. For 11 MBps the modulation is QMBOK. QMBOK consists of quadrature M-ary biorthogonal keying. Eight bits are assigned to a symbol. Four bits select a sign on 1-of-8 Walsh symbols for each the I channel and the Q channel. The Walsh symbol can be viewed as having 8 chips. The quadrature signaling forms a QPSK chip. The following discussion will center on the 11 MBPS QMBOK waveform with QPSK chips. Fallback to 5.5 MBps will accomplished using standard MBOK on the 1-channel only, so the Walsh chip is BPSK. The chip rate is 11 MHZ.

The simplest architecture is shown in FIG. 26 and targets the low-cost, benign multipath environment. This block diagram is a basic, simplified diagram of a portion of the spread spectrum demodulator circuit shown in FIGS. 1A–1F and especially FIG. 1E. For purposes of explanation and simplicity, the basic block components are described without reference to the preceding FIGS. 1A–1F. This architecture works for 30 nsec delay spreads or less. No equalization is used. A low-cost, nonlinear, limiting IF can be used. The diagram includes the I/Q input 120, the carrier loop circuit 122, the chip decision circuit 124, the code word correlator, which in the illustrated embodiment is a Walsh correlator 126, and the symbol decision circuit 128. These elements are also shown in FIG. 1E, with the carrier loop circuit 122 and chip decision circuit 124 shown generally by dotted outline. These elements are shown generally in FIG. 1E. A plot simulated multipath performance is shown in FIG. 27.

In accordance with the present invention, the different aspects of the present invention using equalization are illustrated with increasing performance-complexity characteristics. The 10% packet-error-rate (PER) multipath performance can theoretically exceed 100 nsec RMS delay spreads. Instantaneous equalizer training is achieved using only an estimate of the channel impulse response. It is assumed the impulse response estimate exists with 2 samples/chip, so a preferred decimation phase can be selected. This minimizes noise amplification by feedforward taps in the DFE.

A decision feedback equalizer is shown schematically in FIG. 28. In multipath environments, DFE (and as explained later Viterbi) equalizer outperform to linear equalizer. The DFE performance is provided by the absence of noise amplification in the feedback stage.

Figure 29:
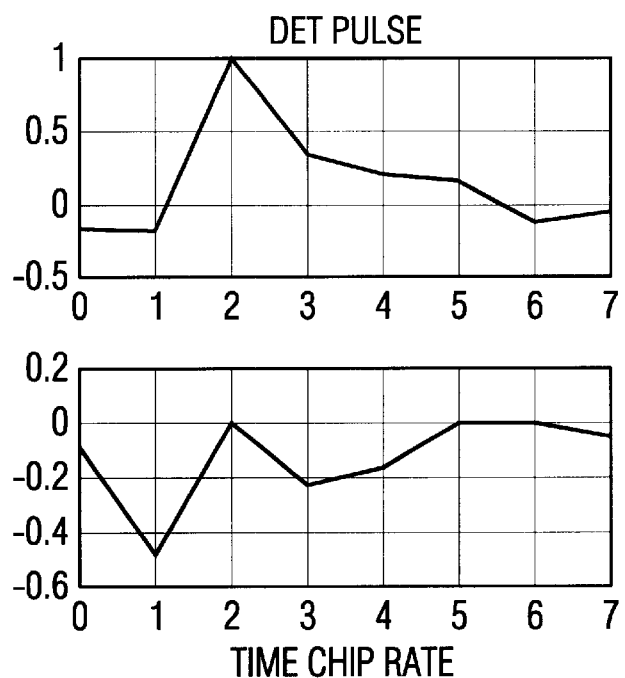
FIG. 29 is a graph illustrating a typical end-to-end impulse response at 100 nsec RMS.

Theoretically, the DFE processes two types of channel information differently. The minimum phase channel components are processed by the feedback (FB) stage, illustrated by block 130, which is formed as a Finite Impulse Response Filter, as known to those skilled in the art, having feedback taps, i.e., formed as a shift register with weighted taps. The maximum phase channel components are processed by the feed-forward (FF) section shown by block 132. A typical impulse response for 100 nsec delay spread is shown in FIG. 29. The peak of the impulse response usually defines a partition between the minimum-phase and maximum-phase channel components. The energy in front of the peak (precursor) is maximum phase, while the energy following the peak (postcursor) is minimum phase.

Figure 30:
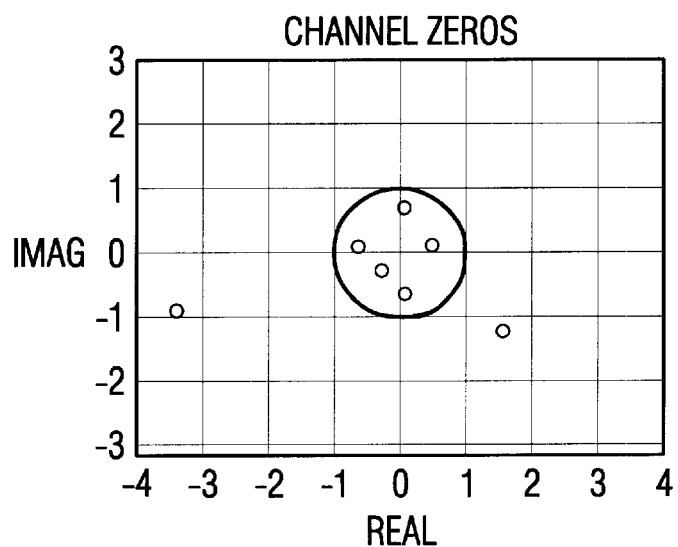
FIG. 30 is a graph illustrating channel zeros for the impulse response shown in FIG. 29.

For a FIR (Finite Impulse Response) channel, the minimum-phase zeros fall inside the unit circle in the Z-plane. The maximum-phase zeros fall outside the unit circle. This is demonstrated for the zeros-plot shown in FIG. 30 for the channel shown in FIG. 31. The two zeros outside the unit circle correspond to the two precursor taps shown in FIG. 29. A zero falling directly on the unit circle is handled by the feedback taps.

Decision feedback equalizers are usually trained using either a zero-forcing metric (ZF) or a minimum-meansquared-error metric (MMSE) as known to those skilled in the art. Most textbooks describe the use of a training sequence with either a slow recursive algorithm (LMS) or a fast recursive algorithm (RLS). Alternatively, for the wireless world, techniques have been developed for instant training using a estimate of the channel impulse response. A preamble (IS-54) or a midamble (GSM) is used with impulsive autocorrelation properties for performing the channel estimation. The channel impulse response can be used to calculate the DFE taps.

Figure 31:
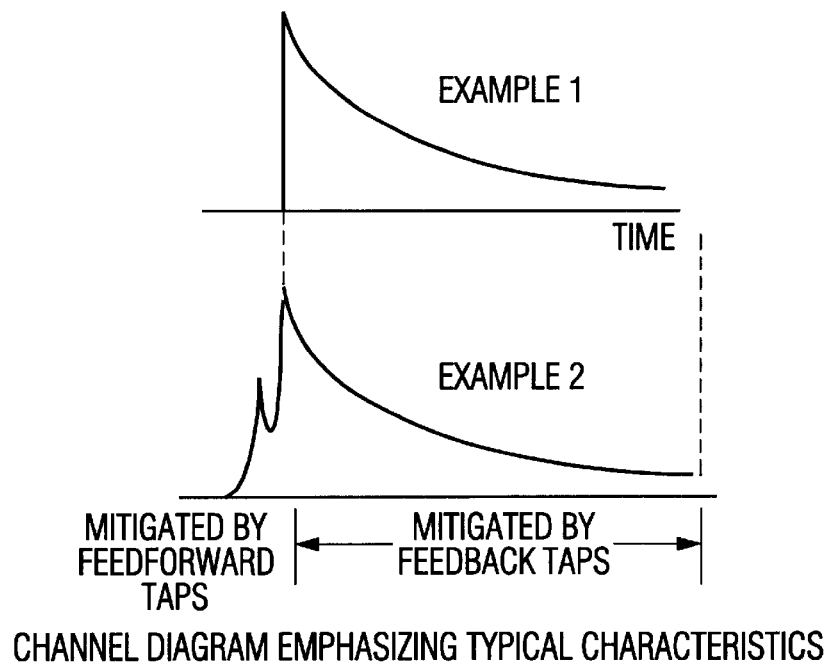
FIG. 31 is a channel diagram emphasizing typical characteristics of multipath.

Most commonly, the 802.11 multipath appears as shown in the two examples of FIG. 31. In the first example, no precursor (maximum-phase) components are present. In example 1, the ideal equalizer weights contain only feedback (FB) taps and no feed forward (FF) taps. The FB taps are set equal to the channel impulse response (1 sample/chip).

Example 2 of FIG. 31 requires FF weight calculation before the FB weights can be computed. Using the zero-forcing (ZF) criterion, two FF weights can be solved using the matrix shown in FIG. 32. Once the channel impulse response is known, the coefficient matrix is known. Simple inversion gives the result. The two FF weights and the $w_1$ and $w_0$ solution is simply $h_1$ and $h_0$ scaled by the same complex constant. Solving for 3 FF taps is similar.

Once the FF weights have been calculated, the FB taps are derived by convolving the channel impulse response with the FF weights. The trailing taps in the output convolution become the FB taps.

To vary complexity, a designer decides how many taps are needed to obtain a desired level of performance. These options are illustrated by using only FB taps, using only 2 FF taps, and using 3 FF taps. The number of FB taps is varied in each case.

Figure 33:
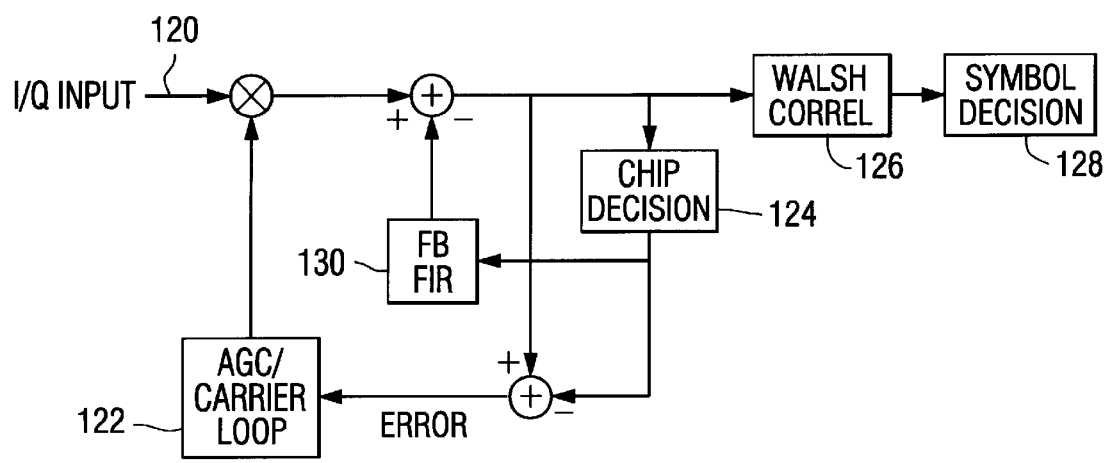
FIG. 33 is a schematic block diagram showing feedback taps only for the demodulation architecture of the spread spectrum demodulator.

The architecture and performance for a DFE, which uses only FB taps, is shown in FIG. 33. For a QPSK signaling element, the FB FIR output computation is very simple because no multiplications are required, only additions and subtractions. The QPSK element decision is ±1±j. Basic circuit components illustrated in FIG. 26 are also present, with the addition of the feedback FIR (Finite Impulse Response) filter 130 having taps as known to those skilled in the art.

The associated multipath performance has been conservatively estimated by the present invention. A packet error is assumed whenever a stochastic channel realization has a closed-eye at the QPSK chip level. This is conservative (worst-case bound) because the correlation gain of the fast Walsh transform is ignored. The differentiation between 64 byte and 1000 byte packets is not made. This is conservative because the data pattern needed to realize an eye closure may be a small probability event.

Figure 34:
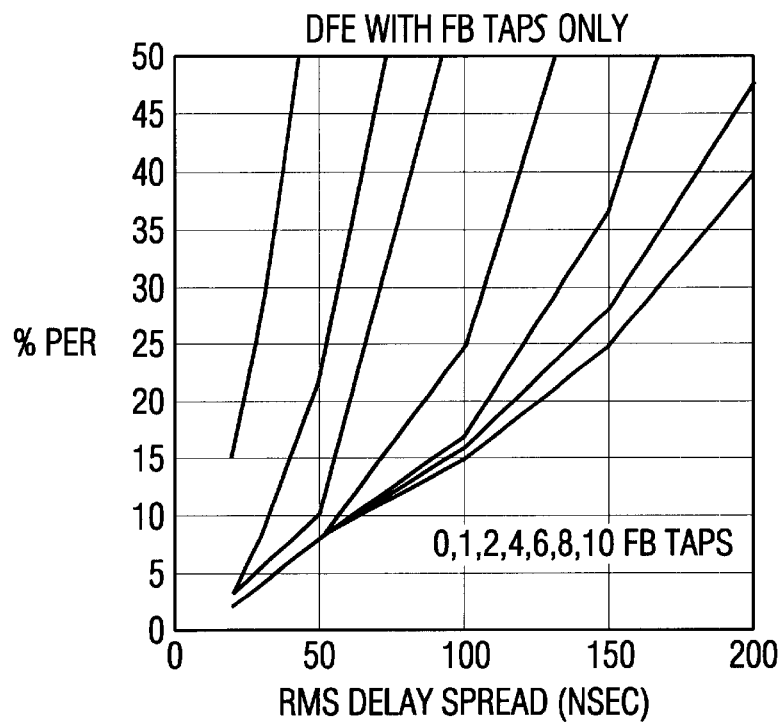
FIG. 34 is a graph illustrating the packet error rate performance in multipath for various feedback tap quantities.

The performance in multipath is shown in FIG. 34. The number of FB taps is varied from 0, 1, 2, 4, 6, 8 and 10.

Only 6 FB taps provides <10% packet errors out to 60 nsec and <20% packet errors out to 110 nsec of RMS multipath. This is very good performance given the simplicity. For this case, only 6 complex adds (or subtracts) are required per chip. This architecture may be good enough for many target environments.

Figure 35:
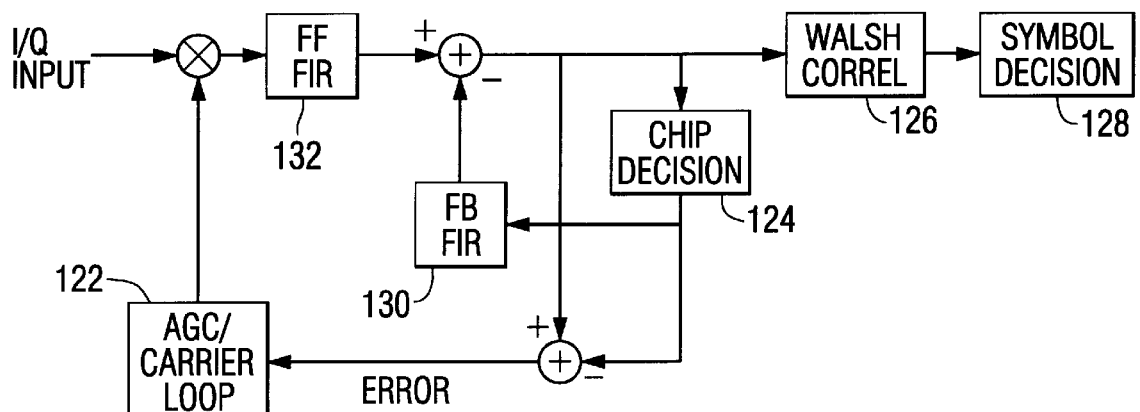
FIG. 35 is a schematic block diagram of a demodulator architecture that includes feed forward DFE taps.

Because the FB-taps-only case makes no attempt to combat precursor multipath components, this section adds little more complexity by using two FF taps as shown in FIG. 35, where the feed forward FIR filter 132 is inserted in line to the Walsh correlator.

The packet error is assumed whenever a stochastic channel realization has a closed-eye at the QPSK chip level. This is conservative (worst-case bound) because the correlation gain of the fast Walsh transform is ignored. Differentiation between 64 byte and 1000 byte packets is not made. This is conservative because the data pattern needed to realize an eye closure may be small probability event.

Figure 36:
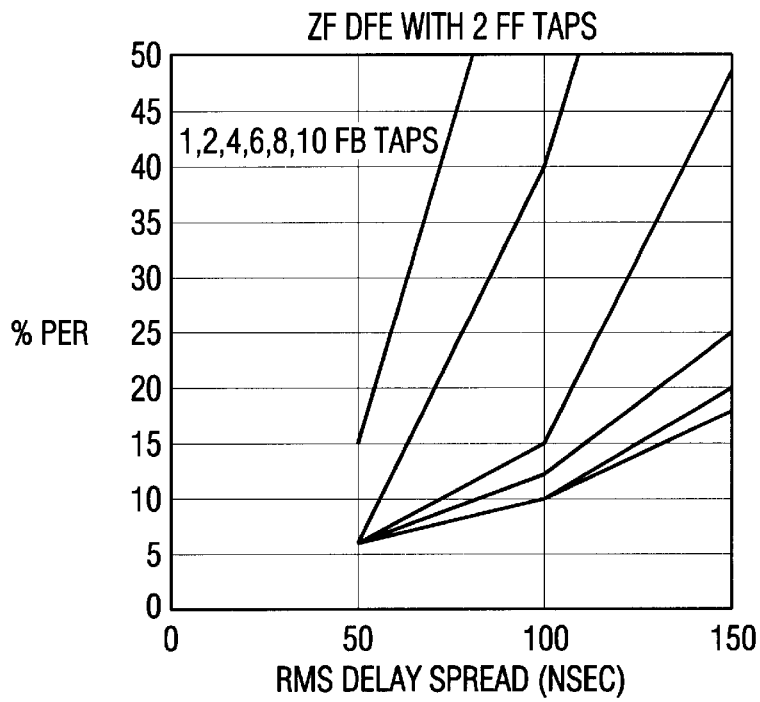
FIG. 36 is a graph illustrating the packet error rate performance and multipath for two feed forward taps and various feedback tap quantities.

The performance in multipath for the structure of FIG. 35 is shown in FIG. 36 for 2 FF taps and various FB taps. The number of FB taps is varied from 1, 2, 4, 6, 8 and 10. As shown on the graphs, only 2 FF taps and 6 FB taps provides <10% packet errors out to 80 nsec and <20% packet errors out to 120 nsec of RMS multipath. This is very good performance given the simplicity. An extra multiply is required per chip.

Figure 37:
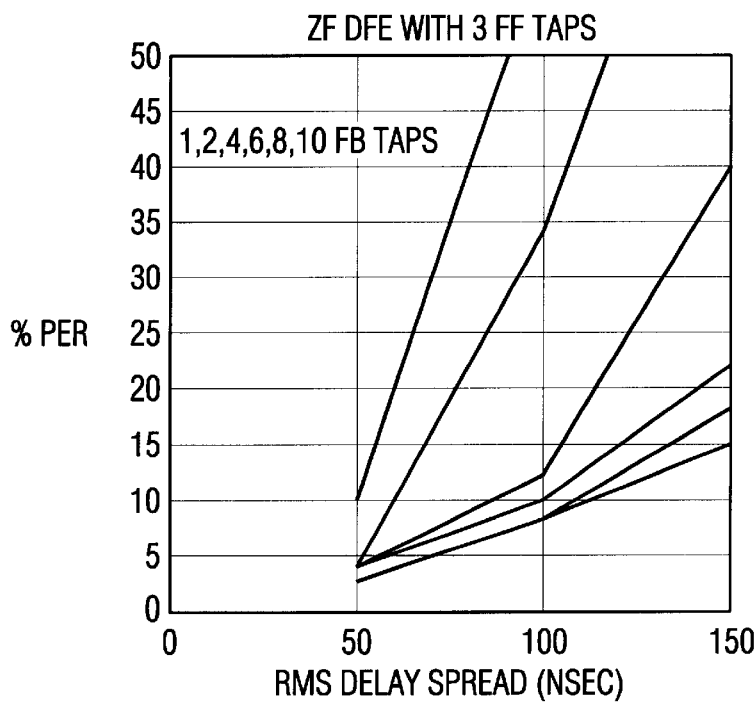
FIG. 37 is a graph illustrating the packet error rate performance and multipath for three feed forward taps and various feedback taps quantities.

It is possible to use 3 FF taps. The architecture remains that shown in FIG. 35. FIG. 36 shows the packet error rate performance in multipath for 2 FF taps and the various FB tap quantity. FIG. 37 shows the packet error rate performance in multipath for 3 FF taps and various FB tap quantities.

As shown in this graph, only 3 FF taps and 6 FB taps provides <10% packet errors out to 100 nsec and <20% packet errors out to 140 nsec of RMS multipath. This is very good performance given the simplicity. Two extra multiplies are required per chip.

Viterbi/Decision-Feedback Equalizer

The present invention also allows a viterbi/decision-feedback equalizer to be used where soft decision information is fed out to the code word correlator (e.g., the Walsh correlator) to make a spread spectrum symbol decision. Viterbi algorithms have been used when processing PSK chips. U.S. Pat. No. 6,535,554, by the assignee of the present invention, discloses a Viterbi algorithm and circuits. A Viterbi equalizer shifts the equalized signal soft decision off the cross correlator so that the correlator works better. This is a key distinction between the present invention and the '554 patent above, the disclosure which is hereby incorporated by reference in its entirety.

The spread spectrum system of the invention has a low enough processing gain where the spread spectrum signal could almost recognize the chips themselves. The viterbi error correction code treats the multipath in a trellis. The receiver circuitry senses the memory or the multipath that the transmitter has placed on the signal. A trellis determines what was most likely. The error correction code is used with the viterbi system. Thus, the multipath is actually placing the error correction code on the signal, and when the signal comes out of the transmitter and begins bouncing off walls and throughout the Wlan environment, the receiver receives the preamble and analyzes and determines the signal and the coding. The circuitry uses the trellis to determine what is a transmit waveform that was coded by the multipath.

It is also possible to use a viterbi/decision-feedback equalizer. This architecture can be varied with increasing performance-complexity characteristics.

The key motive for using the Viterbi-DFE is to strongly combat the precursor distortion in the multipath channel. The feed-forward taps in a DFE are limited in their capability.

The 10% packet-error-rate (PER) multipath performance can theoretically reach 200 nsec RMS delay spreads. Instantaneous equalizer training is achieved using only an estimate of the channel impulse response.

In an additive-white-Gaussian-noise, intersymbol-interference environment, the optimum receiver is the maximum likelihood receiver. This receiver can be implemented using the complexity limiting Viterbi algorithm for performing maximum likelihood sequence estimation (MLSE), which is known to those skilled in the art. A Viterbi MLSE receiver has been used in GSM cell phones. Unfortunately at this time, applying MLSE is too complex for an 802.11 high data rate receiver.

However, the complexity of the Viterbi-based MLSE receiver can be greatly reduced, while maintaining good performance by employing decision feedback techniques. MSLE estimation is used on the precursor portion of the channel and feedback equalization on the post-cursor portion of the channel.

The channel forms a finite state machine (FSM) as shown in FIG. 38. The symbols in the delay elements form the state. The input of a new symbol causes a state transition. The state transitions can be represented by a trellis. The received signal therefore contains memory. An optimal detector can compare the distance between the received signal and the known possible transmit transitions. The minimum distance sequence is the optimum received signal estimate.

The number of states in the trellis is equal to $M^{L-1}$, for an M-ary modulation with a L-tap channel. For QSPK chips, M is 4. For a 100 nsec RMS delay spread channel, L can range to 8. This establishes 16K states. This degree of complexity cannot be readily handled. For QPSK elements, 4 branches enter and exit each state in the trellis.

FIG. 39 illustrates how decision feedback can reduce complexity to an acceptable level. If the channel FSM were cascaded with a decision feedback stage, the overall complexity would be reduced to only the complexity of the precursor taps. This is employed in the receiver.

Figure 40:
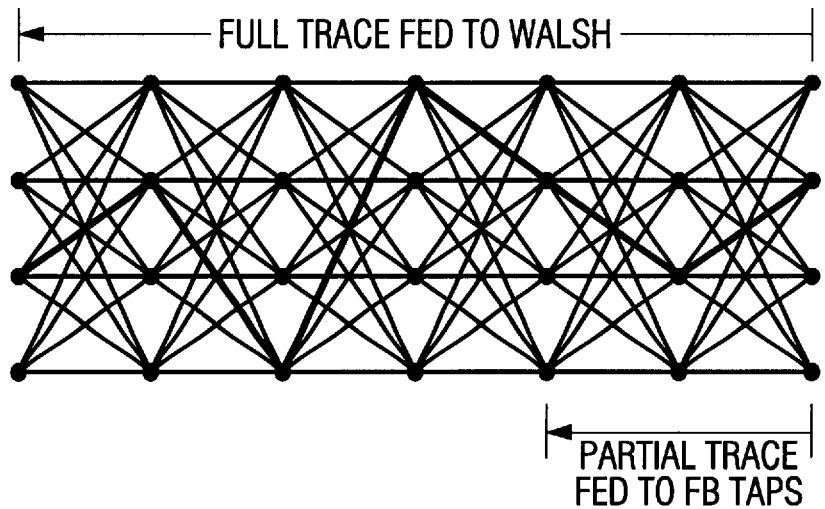
FIG. 40 is a diagram of a trellis that illustrates a partial traceback used to feed a decision feedback stage.

The decisions in the receiver for the feedback stage comes from a partial traceback of the trellis as shown in FIG. 40. A full traceback is used to make the data decision, but the partial traceback fed to the FB taps is often a good estimate of the transmit symbol. Each step in a traceback is equivalent to stepping back one extra memory in the transmit symbol queue. The reliability of the estimate increases with each traceback step.

Figure 41:
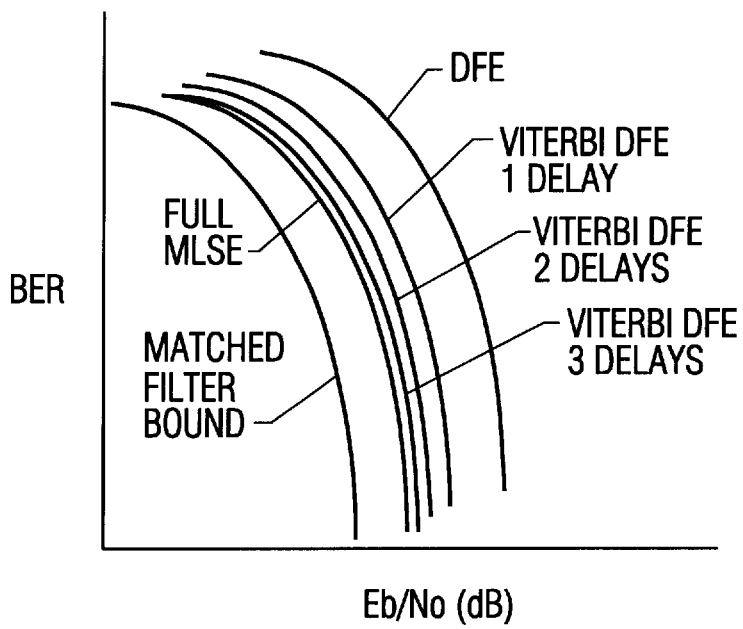
FIG. 41 is a graph illustrating a viterbi DFE performance variation with increasing partial traceback delays.

This reliability is illustrated in FIG. 41. The drawback of the reliability increase is the number of states in the trellis increases by a factor of M-ary for each extra delay.

The complexity in the Viterbi algorithm comes from computing the branch metrics, determining the branch survivors, identifying the best state, and performing the traceback. Memory can be traded against real-time operations.

Figure 42:
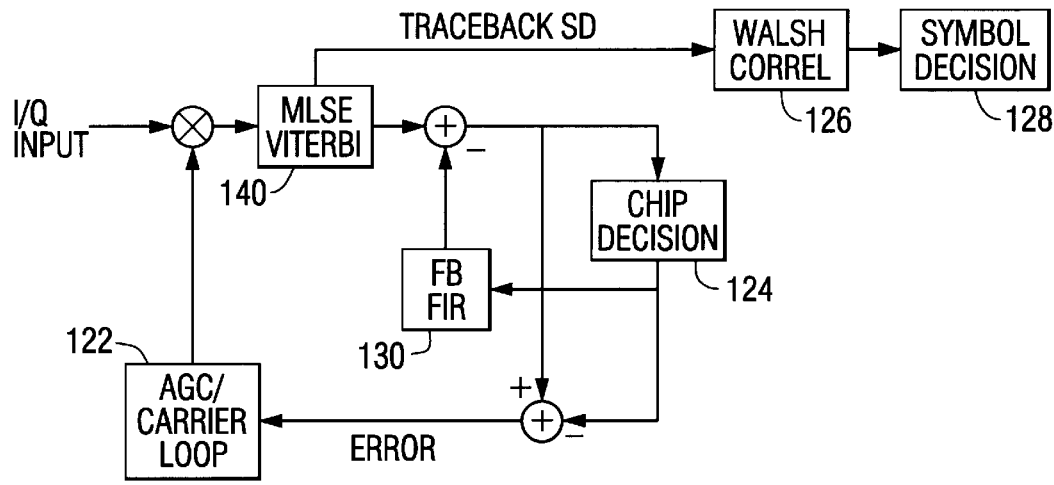
FIG. 42 is a schematic block diagram illustrating a demodulator architecture for the viterbi/DFE.

The architecture for the Viterbi-DFE is shown in FIG. 42. The diagram shows the qualitative details. The I/Q input proceeds to the MLSE viterbi circuit 140. The carrier loop circuit 122, chip decision circuit 124 and feedback FIR 130 are operative with the MLSE viterbi circuit 140 in one branch circuit loop. A traceback SD signal passes from the MLSE viterbi circuit 140 to the Walsh correlator 126.

Figure 43:
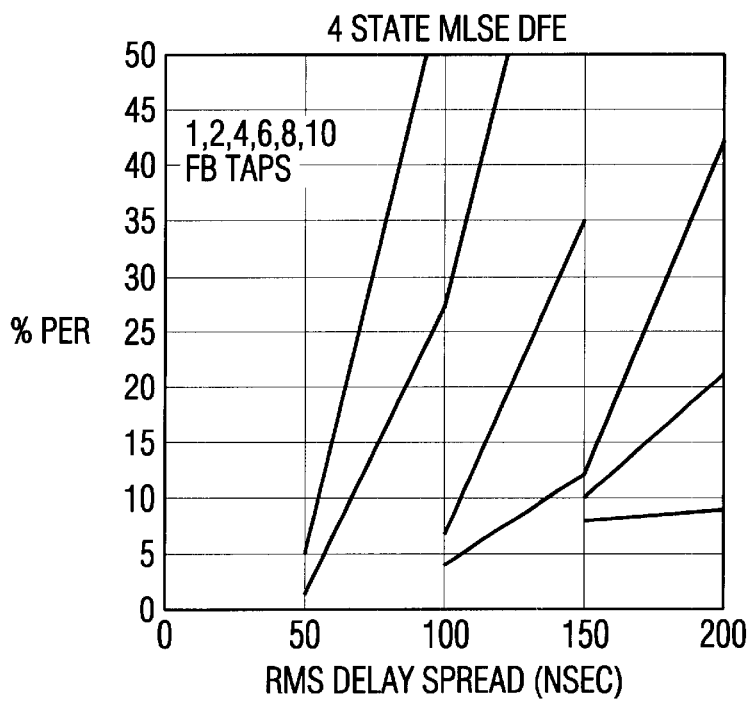
FIG. 43 is a graph showing a multipath-spread performance curves for four state viterbi/DFE.

The performance of a 4-state trellis Viterbi-DFE is shown in FIG. 43. These curves were generated using a conservative bounding technique similar to that used for the DFE. An eye closure metric was measured given the joint operation of the MLSE/DFE. Actually, the Viterbi would often resolve the instantaneous eye closure through the traceback.

The performance for a 16-state trellis Viterbi-DFE is shown in FIG. 44. These curves were generated using a conservative bounding technique similar to that used for the DFE. An eye closure metric was measured given the joint operation of the MLSE/DFE. The Viterbi would often resolve the instantaneous eye closure through the traceback.

One performance summary is shown in the Table of FIG. 45. Multipath performance is presented in 25 nsec RMS increments, ranging from 25 nsec up to 200 nsec. The minimum architecture complexity needed to achieve a 10% packet error rate is shown.

Many instances could be satisfied with 20% packet errors in a very severe environment. If this is acceptable, the ZF DFE with no FF Taps and FB Taps only can be used up to 75 nsec. The ZF DFE with 2 feed forward taps can be used all the way up to 150 nsec RMS spread. Also, the 4 state Viterbi-DFE can reach as far as 175 and 200 nsec RMS spreads. This greatly reduces cost and power draw by allowing the preferred packet error rate of 10% to softly degrade to 20% when conditions are severe.

Figures 46, 47:
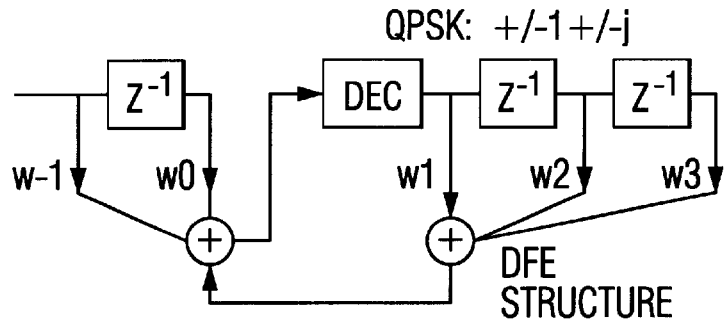
FIG. 46 is a basic DFE structure with map operation/chip.
FIG. 47 illustrates a gate count complexity for two feed forward taps and six feedback taps DFE.

The complexity of only the DFE as shown in FIG. 46 will be described. It is felt the 4 state architecture will be quite reasonable.

The DFE complexity is shown in the table of FIG. 47. The FF taps require a complex multiply each. A complex multiply is 4 real multiplies and 2 real adds. The FB taps operate with only adds/subtracts because the decisions are QPSK.

For 2 FF taps and 6 FB taps, a gate estimate is 10K gates for the DFE tracking structure, 20K for the weights training calculation and 5K for the channel impulse response estimate. These are gate deltas over the 1 and 2 MBps silicon. Probably 6 bit A/D's will be required. This will tend to dominate.

Figure 48:
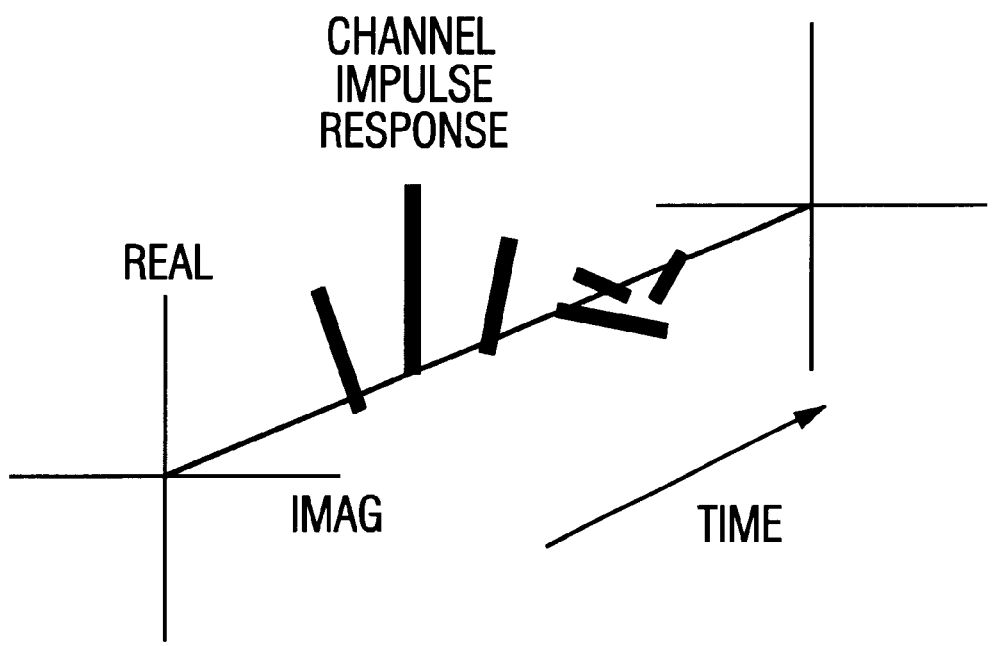
FIG. 48 is a channel impulse response showing amplitude and phase information.

Mitigation of multipath can require an estimate of the channel impulse response as shown in FIG. 48. The invention can use a short preamble if the channel impulse response estimate is sufficiently accurate. The 11 bit Barker may not be sufficiently accurate for large multipath spreads.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method of demodulating a spread spectrum signal comprising the steps of:
   receiving within a demodulator of a spread spectrum receiver a spread spectrum phase shift keyed (PSK) modulated information signal on a signal channel, wherein said information signal includes a sequence of data symbols formed from a plurality of high rate mode chips;
   decoding a precursor portion of the information signal and forming a multi-state trellis having a predetermined number of states;
   feedback equalizing a post-cursor portion of the information signal with a finite impulse response filter having feedback taps operatively connected to a chip detection circuit that tracks high rate mode chips and a carrier loop circuit for phase and frequency tracking; and
   spread spectrum despreading the decoded precursor portion of the information signal within a spread spectrum code function correlator.

2. A method according to claim 1, and further comprising the step of performing a partial signal trace back of the multi-state trellis to the feedback taps of the finite impulse response filter.

3. A method according to claim 1, wherein said spread spectrum despreading the decoded precursor portion of the information signal comprises the step of passing a trace back soft decision signal from a Viterbi decoder circuit to the spread spectrum code function correlator.

4. A method according to claim 1, wherein said information signal includes a sequence of data symbols formed from a plurality of high rate mode chips, wherein said signal channel forms a finite state machine, and further comprising the step of establishing a predetermined number of states within the multi-state trellis.

5. A method of demodulating a spread spectrum signal comprising the steps of:
   receiving within a demodulator of a spread spectrum receiver a spread spectrum phase shift keyed (PSK) modulated information signal on a signal channel;
   Viterbi decoding a precursor portion of the information signal and providing a traceback soft decision signal;
   feedback equalizing a post-cursor portion of the information signal; and
   spread spectrum despreading the traceback soft decision signal within a spread spectrum code function correlator.

6. A method according to claim 5, and further comprising the step of passing the traceback soft decision signal from a Viterbi decoder to the spread spectrum code function correlator.

7. A method according to claim 5, wherein said information signal includes a sequence of data symbols formed from a plurality of high rate mode chips, wherein said signal channel forms a finite state machine, and further comprising the step of establishing a predetermined number of states within a multi-state trellis.

8. A method according to claim 7, and further comprising the step of comparing the distance between the received signal and known possible transmit state transitions, and determining an optimum received signal estimate.

9. A method according to claim 7, and further comprising the step of forming a 4-state trellis.

10. A method according to claim 7, and further comprising the step of forming a 16-state trellis.

11. A spread spectrum radio transceiver comprising:
    a baseband processor and radio circuit connected thereto, said baseband processor comprising,
       a demodulator for spread spectrum phase shift keying (PSK) demodulating an information signal on a signal channel, wherein said information signal includes data symbols formed from a plurality of high rate mode chips forming a spread spectrum information signal, said demodulator comprising
       a Viterbi decoder that receives the information signal and decodes a precursor portion of the information signal and that provides a corresponding trace back soft decision signal;
       at least one spread spectrum code function correlator for decoding said trace back soft decision signal according to a predetermined spreading code sequence;
       a carrier loop circuit for phase and frequency tracking the information signal;
       a chip decision circuit operative with the carrier tracking loop for tracking high rate chips;
       a decision feedback equalizer formed from a finite impulse response filter operative with the chip decision circuit and carrier loop circuit, and having a plurality of feedback taps, wherein at least one feedback tap is selected for logical add/subtract operations for equalizing a post-cursor portion of the information signal; and a modulator for spread spectrum PSK modulating information for transmission via the radio circuit, said modulator comprising at least one code function encoder for encoding information according to an orthogonal code sequence.

12. A spread spectrum radio transceiver according to claim 11, wherein said at least one spread spectrum code function correlator comprises a Walsh correlator.

13. A spread spectrum radio transceiver according to claim 11, wherein said Viterbi decoder further comprises means for generating said trace back soft decision signal to the spread spectrum code function correlator.

14. A spread spectrum radio transceiver according to claim 11, wherein said Viterbi decoder further comprises means for generating a partial trace back signal to predetermined feedback taps of said finite impulse response filter.

15. A spread spectrum radio transceiver according to claim 11, wherein said carrier loop circuit comprises:
 a carrier numerically controlled oscillator (NCO); and
 a carrier NCO control means for selectively operating the carrier NCO based upon a carrier phase on the carrier tracking loop.

16. A spread spectrum radio transceiver comprising:
 a baseband processor and a radio circuit connected thereto, said baseband processor comprising
 a demodulator for spread spectrum phase shift keying (PSK) demodulating an information signal on a signal channel, wherein said information signal includes data symbols formed from a plurality of high rate mode chips forming a spread spectrum information signal, said demodulator comprising,
 a Viterbi decoder that receives the information signal and decodes a precursor portion thereof, and generates a traceback soft decision signal;
 at least one said spread spectrum code function correlator for decoding said traceback soft decision signal of the information signal according to a predetermined spreading code sequence;
 a decision feedback equalizer operative with said Viterbi decoder for equalizing a post-cursor portion of the information signal; and
 a modulator for spread spectrum PSK modulating information for transmission via the radio circuit, said modulator comprising at least one code function encoder for encoding information according to a spreading code sequence.

17. A spread spectrum radio transceiver according to claim 16, wherein said at least one spread spectrum code function correlator comprises a Walsh correlator.

18. A demodulator for a spread spectrum radio transceiver, said demodulator comprising:
 a demodulator circuit for spread spectrum phase shift keying (PSK) demodulating an information signal on a signal channel, wherein said information signal includes data symbols formed from a plurality of high rate mode chips forming a spread spectrum information signal, said demodulator comprising
 a Viterbi decoder that receives the information signal and decodes a precursor portion of the information signal;
 at least one spread spectrum code function correlator for decoding said precursor portion of the information signal according to a predetermined spreading code sequence;
 a carrier loop circuit for phase and frequency tracking the information signal;
 a chip decision circuit operative with the carrier loop circuit for tracking high rate chips;
 a decision feedback equalizer formed from a finite impulse response filter operative with the chip decision circuit and carrier loop circuit, and having a plurality of feedback taps, wherein at least one feedback tap is selected for logical add/subtract operations for equalizing a post-cursor portion of the information signal.

19. A demodulator according to claim 18, wherein said at least one spread spectrum code function correlator comprises a Walsh correlator.

20. A demodulator according to claim 18, wherein decoding said precursor portion of the information signal further comprises means for generating a trace back soft decision signal to the spread spectrum code function correlator.

21. A demodulator according to claim 18, wherein said Viterbi decoder further comprises means for generating a partial trace back signal to predetermined feedback taps of said finite impulse response filter.

22. A demodulator according to claim 18, wherein said carrier loop circuit comprises:
 a carrier numerically controlled oscillator (NCO); and
 a carrier NCO control means for selectively operating the carrier NCO based upon a carrier phase on the carrier tracking loop.

23. A demodulator for a spread spectrum radio transceiver, said demodulator comprising:
 a demodulator circuit for spread spectrum phase shift keying (PSK) demodulating an information signal on a signal channel, wherein said information signal includes data symbols formed from a plurality of high rate mode chips forming a spread spectrum information signal, said demodulator comprising
 a Viterbi decoder that receives the information signal and decodes a precursor portion of the information signal and generates a traceback soft decision signal;
 at least one spread spectrum code function correlator for decoding said traceback soft decision signal according to a predetermined spreading code sequence;
 a decision feedback equalizer operative with said Viterbi decoder for equalizing a post-cursor portion of the signal channel.

24. A demodulator according to claim 23, wherein said at least one spread spectrum code function correlator comprises a Walsh correlator.

* * * * *